(12) United States Patent
Hirvela et al.

(10) Patent No.: US 8,386,415 B2
(45) Date of Patent: Feb. 26, 2013

(54) PORTABLE WIRELESS ENABLED DIGITAL MEDIA FRAME

(75) Inventors: George Hirvela, Carrollton, GA (US); Melvin D. Frerking, Norcross, GA (US); Thomas Keathley, Mableton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 956 days.

(21) Appl. No.: 12/325,812

(22) Filed: Dec. 1, 2008

(65) Prior Publication Data

US 2010/0138365 A1 Jun. 3, 2010

(51) Int. Cl.
*G06F 15/00* (2006.01)
*G06F 15/18* (2006.01)
*G06F 15/177* (2006.01)
*G06F 15/16* (2006.01)

(52) U.S. Cl. ............................ 706/62; 709/220; 709/229
(58) Field of Classification Search .................... None
See application file for complete search history.

(56) References Cited

U.S. PATENT DOCUMENTS

| | | | | |
|---|---|---|---|---|
| 5,909,491 A * | 6/1999 | Luo | ................................ | 380/270 |
| 6,509,910 B1 * | 1/2003 | Agarwal et al. | ................ | 715/752 |
| 6,717,567 B1 | 4/2004 | Bowden, III et al. | | |
| 6,910,024 B2 | 6/2005 | Krishnamurthy et al. | | |
| 6,961,046 B2 | 11/2005 | Bowden, III et al. | | |
| 7,107,605 B2 * | 9/2006 | Janik | ............................... | 725/51 |
| 7,155,679 B2 * | 12/2006 | Bandaru et al. | ............... | 715/748 |
| 7,539,156 B2 | 5/2009 | Leung et al. | | |
| 7,844,286 B1 * | 11/2010 | Sennett et al. | ................. | 455/466 |
| 2002/0126150 A1 * | 9/2002 | Parry | ............................. | 345/771 |
| 2005/0159132 A1 | 7/2005 | Wright et al. | | |
| 2006/0223495 A1 * | 10/2006 | Cassett et al. | ................. | 455/405 |
| 2007/0076665 A1 * | 4/2007 | Nair et al. | ...................... | 370/335 |
| 2007/0105527 A1 | 5/2007 | Nylander et al. | | |
| 2007/0220016 A1 | 9/2007 | Estrada et al. | | |
| 2007/0226734 A1 | 9/2007 | Lin et al. | | |
| 2007/0245125 A1 * | 10/2007 | Telesco | ........................... | 712/29 |
| 2007/0282907 A1 * | 12/2007 | Chambers | .................. | 707/104.1 |
| 2008/0046649 A1 | 2/2008 | Ito et al. | | |

(Continued)

FOREIGN PATENT DOCUMENTS

WO 00/21419 A2 4/2000

OTHER PUBLICATIONS

More Nokia Coolness: Digital Picture Frame. Nokia digital picture frame that interfaces with SMS or MMS capability in cell phone. Posted Sep. 24, 2003 http://www.russellbeattie.com/notebook/1004415.html. Last accessed Apr. 9, 2009, 2 pages.

(Continued)

*Primary Examiner* — Jeffrey A Gaffin
*Assistant Examiner* — Stanley K Hill
(74) *Attorney, Agent, or Firm* — Turocy & Watson, LLP

(57) ABSTRACT

A wireless enabled digital media frame that can communicate over a wireless wide area network (WWAN) is provided. The wireless enabled digital media frame comprises an internal or external WWAN modem (e.g. GPRS/EDGE/UMTS/HSPA/LTE) such that the one or more media is transferred to the media frame using a wireless connection (e.g. 2G/3G/3.5G/4G). The wireless enabled digital media frame displays the received media files on a display screen. Further, broadcast alerts received over the WWAN and/or calculated current signal strength is also displayed on the display screen. Furthermore, setting information is received by the WWAN modem and accordingly applied to modify or update media frame functions.

20 Claims, 16 Drawing Sheets

U.S. PATENT DOCUMENTS

| | | | | |
|---|---|---|---|---|
| 2008/0052348 | A1 | 2/2008 | Adler et al. | |
| 2008/0201420 | A1* | 8/2008 | Wong et al. | 709/204 |
| 2008/0205205 | A1* | 8/2008 | Chiang et al. | 369/30.04 |
| 2008/0208936 | A1* | 8/2008 | Lee | 707/205 |
| 2008/0250431 | A1* | 10/2008 | Lee et al. | 719/328 |
| 2009/0094351 | A1 | 4/2009 | Gupta et al. | |
| 2009/0276485 | A1* | 11/2009 | Casassovici | 709/203 |
| 2010/0022218 | A1* | 1/2010 | Chen | 455/411 |
| 2010/0120447 | A1 | 5/2010 | Anderson et al. | |
| 2010/0138747 | A1 | 6/2010 | Cheng et al. | |
| 2011/0050417 | A1 | 3/2011 | Piccioni | |
| 2011/0231441 | A1* | 9/2011 | Chambers | 707/769 |

OTHER PUBLICATIONS

Batista. Nokia Snapshot of the Future. Nokia digital picture frame that interfaces with SMS or MMS capability in cell phone. Posted Sep. 29, 2003. http://www.wired.com/gadgets/miscellaneous/news/2003/09/60605. Last accessed Apr. 9, 2009, 2 pages.

The eStarling WiFi photo frame does Flickr. http://www.engadget.com/2006/01/10/the-estarling-wifi-photo-frame-does-flickr/. Last accessed Apr. 9, 2009, 3 pages.

Pix-Star http://www.pix-star.com/bluetooth-digital-photo-frame. Last accessed Apr. 9, 2009, 3 pages.

User Guide for Nokia Image Frame SU-7. Last accessed Feb. 27, 2009, 34 pages.

Nokia Imaging Enhancements—Fulfilling the Imaging Experience. Press Backgrounder, Mar. 2004. Last accessed Feb. 27, 2009, 3 pages.

eStarling Connected Wireless Digital Photo Frames http://www.estarling.com/products.sf. Last accessed Jul. 24, 2009, 2 pages.

eStarling launches Impact7 Wi-Fi Digital Photo Frame http://www.techgadgets.in/displays/2008/20/estarling-launches-impact7-wi-fi-digital-photo-frame/. Last accessed Jul. 24, 2009, 6 pages.

OA dated Mar. 29, 2011 for U.S. Appl. No. 12/325,619, 44 pages.

OA dated May 2, 2012 for U.S. Appl. No. 12/325,619, 24 pages.

* cited by examiner

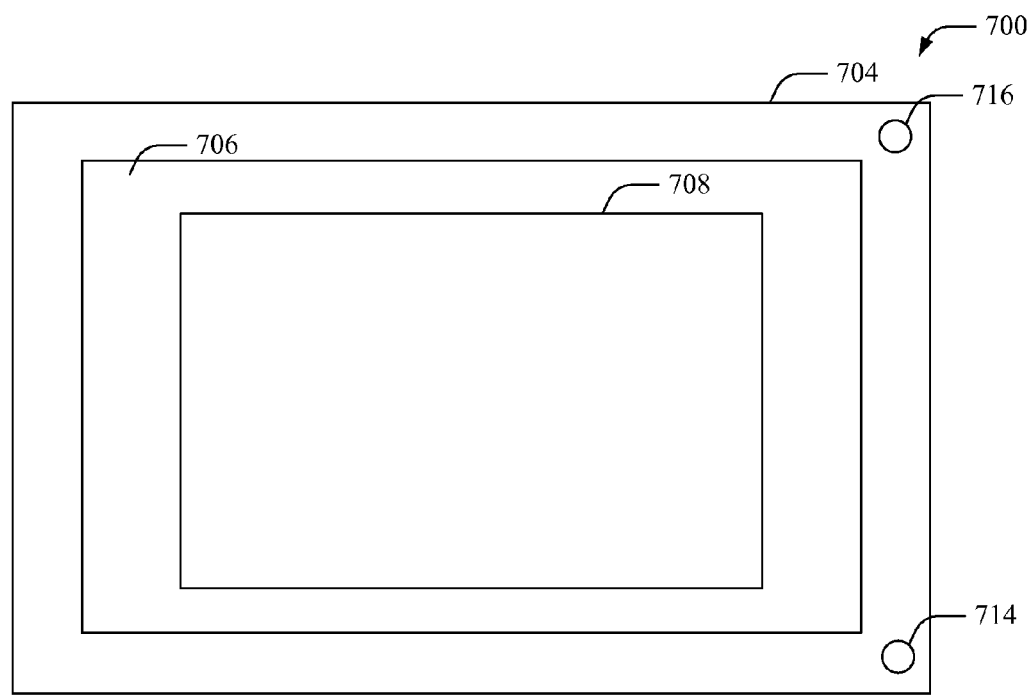
FIG. 7 A
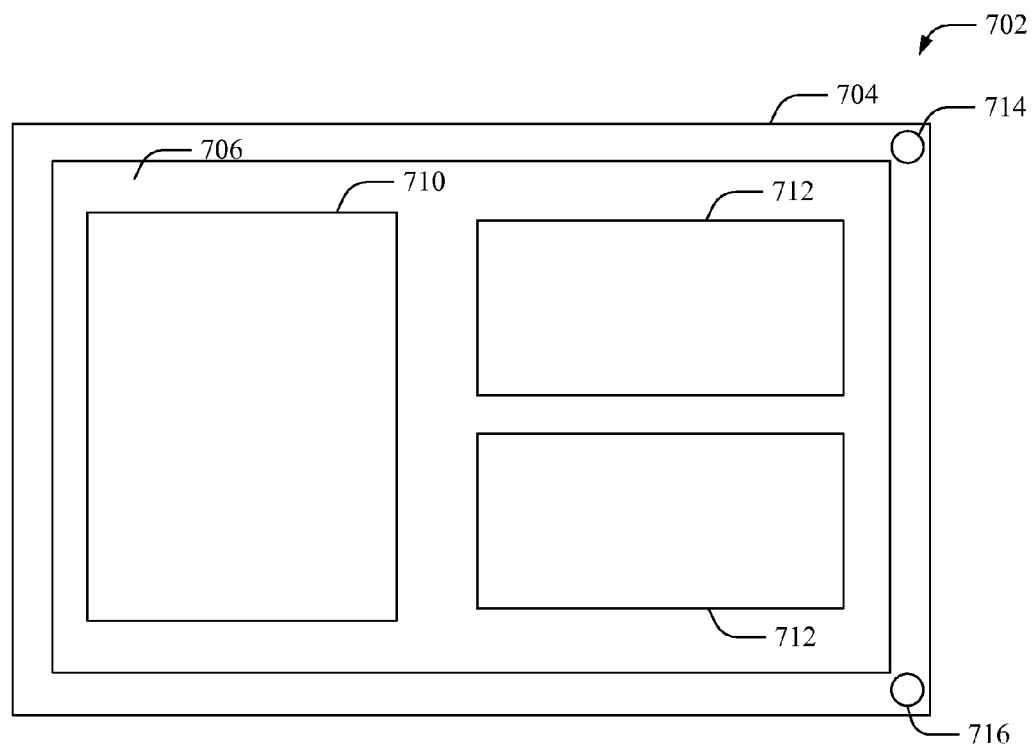
FIG. 7 B
FIG. 7

PORTABLE WIRELESS ENABLED DIGITAL MEDIA FRAME

CROSS-REFERENCE TO RELATED APPLICATIONS

This application is relates to co-pending U.S. patent application Ser. No. 12/325,619, filed on Dec. 1, 2008, entitled "CONTENT MANAGEMENT FOR WIRELESS DIGITAL MEDIA FRAMES". The entireties of which are incorporated herein by reference.

BACKGROUND

Today's consumers are moving to more visual displays of various media in a display setting. One such application is the use of digital picture frames, which is increasingly gaining popularity due to its ease of use. Typically, a digital picture frame is a device that can be employed to display one or more digital pictures on a screen, such as an LCD screen. Multiple pictures can be viewed on the digital picture frame by employing a slideshow format. Digital photo frames are typically about the size and shape of a regular photo frame and can be employed to share digital photos with persons that do not have access to a computer.

Conventionally, digital picture frames display images from files stored on the picture frame that have been loaded into memory. The files are typically loaded onto the frame via a memory stick, compact flash card, SD or other memory card types. In addition, a user can typically employ a USB cable to transfer pictures from a PC (personal computer) to the digital photo frame. Alternately, a few conventional frames can connect to the Internet via a phone line to download new pictures and information to display on the screen.

Advances in digital photography are rapidly increasing the use of digital photographs and with the reducing cost of digital photo frames, most consumers are employing digital photo frames to display and/or view their digital pictures rather than traditional frames that display photo prints. However, consumers require basic computer knowledge and/or access to a PC to download their digital pictures to the digital photo frame. More recent picture frames have a Wi-Fi (Wireless Fidelity) modem where users can transfer images to the digital photo frame via a wireless LAN (Local Area Network) connection from a PC or server. However, consumers can download photos onto the frame only when within the range of the LAN access point. Wi-Fi networks use radio technologies called IEEE 802.11 (a, b, g, etc.) to provide wireless connectivity but have a limited range.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate wireless communications over a wide area network (WAN) to download one or more media files. The downloaded media files can be output to an end user, for example displayed on a display screen and/or played via a speaker. A system subscriber can transfer media files from a remote location over a wireless wide area network (WWAN) to the system located in a coverage area of the mobile wireless network. Thus, the end user can easily view media files sent by the system subscriber without operating a PC or understanding the technical details behind the system.

In accordance with another aspect of the system, a media receiving component can be employed to receive most any form of media, such as but not limited to, an image, data, an audio file, a video file and/or a combination thereof sent by a system subscriber over a WWAN network. In particular, the media receiving component can employ a WWAN modem to communicate with and download media files from the WWAN. Additionally, the media receiving component can also receive broadcast messages, such as, but not limited to, wireless emergency alerts, weather advisories, etc. Further, information associated with setting changes defined by a system subscriber can also be downloaded by the media receiving component.

Another aspect of the subject innovation comprises a display component that can display the media files downloaded by the media receiving component to an end user. In one example, the display component can display a digital image/text or play a video clip on a display screen and/or play an audio clip via a speaker. According to an aspect, the display component can determine a location on the display screen that the received media can be displayed and/or superimposed. Further, the display component can display received emergency warning messages and/or current signal strength information on top of or along with a currently displayed image (or video). The display component can be employed to display multiple images, data, videos and/or output audio on the display screen in a slide show format.

Still another aspect of the system comprises a security component that facilitates security checks on the files downloaded by the media receiving component to determine if the downloaded media is sent by an authorized user. The security component can verify that the files downloaded by the media receiving component are sent by an authorized user by comparing sender information with a list of authorized senders. Media files received from unauthorized users can be blocked and/or deleted and media files received from authorized user can be displayed by the display component. Further, media files received from authorized senders can stored in memory and a memory status can be sent to the WWAN server and/or to the system subscriber.

Another aspect of the system relates to a setting component that enables a user to change various settings of system. According to an aspect, setting information can be received from a system subscriber at a remote location over the WWAN to modify the current setting of system. In one example, the end user can also change one or more system settings by employing most any input device, such as but not limited to, a touch screen display, a keypad, etc. Further, a machine learning technique can be employed to automatically change a setting based on user preferences.

Yet another aspect of the disclosed subject matter relates to a method that can be employed to display of media files received over WWAN. In particular, information can be received over the WWAN that can include one or more media files, broadcast alerts and/or data associated with user settings. A security check can be performed to determine whether the received information is sent by an authorized user. When information is received from an unauthorized sender, the information can be rejected, blocked and/or deleted and when information is received from an authorized sender, a determination is made to verify if the received media files can be stored in the memory based on the amount of available free space in the memory. According to an aspect, when the memory is full and the media files cannot be completely downloaded, the WWAN can be updated with the current memory status. Further, user preferences can be determined and the received media files can be displayed to the end user based in part on the preset user preferences.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 7 illustrates example digital media frames that employ a wireless wide area network modem in accordance with an aspect of the disclosed subject matter.

DETAILED DESCRIPTION

Figure 1:
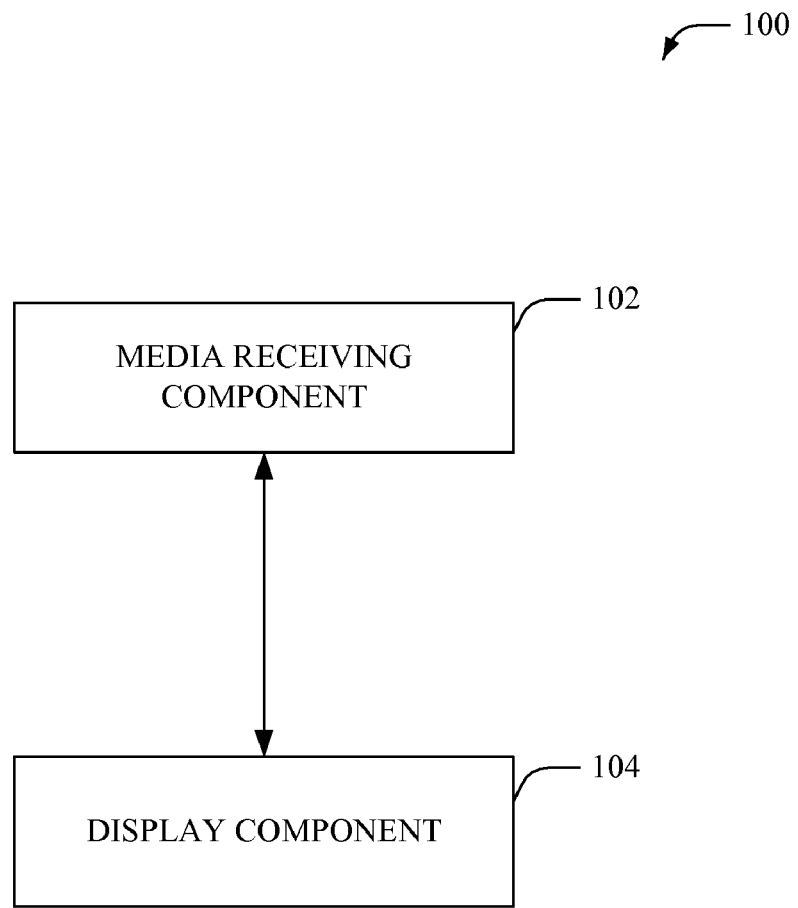
FIG. 1 illustrates an example system that can facilitate displaying images received from a WWAN (wireless wide area network), according to an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. The terms "photo", "picture", "photograph" or the like are generally intended to refer to a digital image, for example, which can be captured by a digital camera or can be a scanned image.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Inference can also refer to techniques employed for composing higher-level events from a set of events or data. Such inference can result in the construction of new events or actions from a set of observed events and/or stored event data, whether or not the events are correlated in close temporal proximity, and whether the events and data come from one or several event and data sources. Various classification schemes and/or systems (for example, support vector machines, neural networks, expert systems, Bayesian belief networks, fuzzy logic, data fusion engines, or other similar systems) can be employed in connection with performing automatic and/or inferred actions.

Conventional digital picture frames display images and/or text associated with the images, from files stored on the picture frame, which have been loaded into memory. The files can be loaded onto the frame via a memory stick, compact flash card, SD or other memory card types and/or can be received by employing a Wi-Fi modem via a wireless LAN connection from a PC (Personal Computer) or server. The subject specification relates to a digital media frame that employs a Wireless Wide Area Network (WWAN) modem, such as but not limited to, GPRS/EDGE/CDMA/UMTS/HSPA/LTE such that digital images and/or media can be transferred to the media frame using a wireless connection (e.g. 2G/3G/3.5G/4G).

Wireless data modems are becoming more prolific in custom applications such as meter reading, automotive applications and as wireless connectivity to routers but real consumer applications have not been considered. Systems and/or methods are presented herein that can employ a wireless module in a digital media frame such that images transferred over the wireless network, such as but not limited to, 2G/3G/3.5G/4G network, can be displayed. The wireless module can include control functions to enable communication with the wireless network and transfer of data in a downlink (DL). According to an aspect, the module can be downlink enabled and additionally can allow the ability to transfer data in the uplink (UL) direction beyond control channels. Specifically, the module can allow data and voice communication.

Referring initially to FIG. 1, illustrated is an example system 100 that can facilitate displaying images received from a WWAN (wireless wide area network), according to an aspect of the subject specification. The system 100 can be a portable media display device, such as a wireless enabled digital media frame that can be employed as a remote device on a mobile wireless network, for example, a 2G or 3G network. A system subscriber can transfer multimedia content, such as, digital photos, audio content and/or videos to the system 100. The system 100 can support most any format of media files, such as but not limited to, JPEG (Joint Photographic Experts Group), TIF (Tagged Image File), PNG (Portable Network Graphics), MPEG (Moving Picture Experts Group) 2, MPEG 4, MP3 (MPEG-1 Audio Layer 3), etc. According to one aspect, a system subscriber can be a mobile subscriber or even a non-mobile user or subscriber to a competitor's network who subscribes separately to transfer media to system 100. Moreover, the system 100 can be employed on a remote display device, on a mobile wireless network such as a 2G or 3G network, by which the system subscriber can transfer multimedia content. Further, the system 100 could also be associated with a Femtocell.

The system 100 can typically include a media receiving component 102 that can receive most any form of media, such as but not limited to, an image, data, an audio file, a video file and/or a combination thereof via a WWAN network. According to an aspect, the media receiving component 102 can include a wireless wide area network modem (not shown) that can facilitate transfer of media to and/or from the WWAN. It can be appreciated that although a WWAN modem is described herein, wired modems, such as a dialup modem, DSL (digital subscriber line) connected modem, power line communications, etc. can be employed to connect to a mobile wireless network. In addition to downloading media files, the media receiving component 102 can receive broadcast messages, such as, but not limited to, wireless emergency alerts, weather advisories, etc. Further, it can be appreciated that the media receiving component 102 can also receive live streaming video and/or audio. As an example, a voice call can be received by the media receiving component 102 and live streaming audio can be downloaded over the WWAN. The voice call can be initiated by a system subscriber and/or authorized user to communicate with the end user (or vice versa). For example, a mother can employ system 100 to receive digital photographs sent over the WWAN by her son and further, establish a voice call so she can listen to him talk about each photograph displayed to her.

In one aspect, the media receiving component 102 can employ one or more cellular network technologies, for example, WIMAX (Worldwide Interoperability for Microwave Access), UMTS (Universal Mobile Telecommunications System), GPRS (General Packet Radio Service), CDMA2000, GSM (Global System for Mobile communications), Mobitex, HSDPA (High-Speed Downlink Packet Access) or 3G (Third Generation) to transfer data. The media receiving component 102 can perform downlink (DL) reception and can additionally also be employed to perform uplink (UL) control, and possible UL communications. In one aspect, the media receiving component 102 can store the downloaded media files in a data store, such as an internal, external, removable memory and/or a combination thereof. It can be appreciated that the data store described herein can be either volatile memory or nonvolatile memory, or can include both volatile and nonvolatile memory, such as but not limited to, read only memory (ROM), programmable ROM (PROM), electrically programmable ROM (EPROM), electrically erasable PROM (EEPROM), flash memory or random access memory (RAM), which can act as external cache memory.

The media receiving component 102 can further schedule downloads from the WWAN at predefined intervals of time. For example, a user (e.g. a system subscriber and/or an end user) can set a predefined time interval, such as, but not limited to, download media sent to system 100, if any, once a day at a specified time. Additionally or alternately, the media receiving component 102 can download media based on network traffic in a manner to avoid congestion. Further, the media receiving component 102 can check the received media files for unauthorized access, such that only files received from authorized users can be saved. In one example, a list of authorized users can be saved by a user in a database (not shown) internal or external to the system 100. In addition, the media receiving component 102 can receive media files via memory cards, a USB outlet, a wired phone line connection, an internet connection, a Wi-Fi connection, a Bluetooth® connection or the like.

System 100 can further include a display component 104 that can display the media files, downloaded by the media receiving component 102, to an end user, for example, on a display screen. By way of illustration, and not limitation, the display screen can be an LCD (liquid crystal display) screen of most any size or shape. In one embodiment, the display screen can be a touch screen that can allow a user to easily interact with the system 100. Typically, the display screen can be framed, for example using a wooden, metal and/or plastic frame. Further, the display component 104 can also output audio via a speaker. According to an aspect, the display component 104 can determine a location on the display screen that the received media can be displayed. As an example, text information associated with an image can be superimposed on the image or place at a particular location. Further, the display component 104 can display emergency warning messages on top of or along with an image. According to an aspect, the display component 104 can determine if a received picture is in a landscape or portrait format and display the picture such that the picture can be viewed accordingly.

The display component 104 can also display multiple images, data, videos and/or output audio on the display screen as a slide show. The settings for the slide show can be user defined and/or automatically determined by a machine learning technique. Further, the display component 104 can display the most recently downloaded media files, for example, for a longer period than the older files. In one aspect, the media receiving component 102 downloads a digital image sent by a user along with associated text and the display component 104 display this image and text for a long time or until the new image has been viewed. For example, system 100 can be employed by a grandmother to receive a digital picture from her granddaughter at her first football game. Text can also be attached to the picture, e.g. "Jenny's first Football game". The media receiving component 102 can download the picture and the text, and the display component 104 can display the picture and text such that the grandmother can view the photograph without operating a PC or understanding the technical details behind the system 100. Further, the display component 104 can operate in a browse mode wherein a user can manually browse through the media files.

According to an aspect, three different types of users can interact with the system 100, namely, a system subscriber, an end user and an auxiliary user. As an example, a son can buy a digital media frame that includes system 100 for his mother and remotely control the frame for her over a WWAN. In this example, the son can be called a "system subscriber" and the mother can be called an "end user". Moreover, the son (system subscriber) can administer the media frame over the WWAN from his cellular phone, PDA, computer, or other device. The mother (end user) is the recipient and user of the media frame. According to an aspect, the mother (end user) can have limited control over the media frame, such that, her capabilities and permissions can be set by the system subscriber (son). Further, a third type of user, a cousin, for example, can be an "auxiliary user". In accordance with one aspect, the auxiliary user can be given limited access to the system 100 such that they can be allowed to download material to the frame either with or without permission of the system subscriber (son). Thus, the system subscriber (son) can establish various profiles associated with different auxiliary users that can submit material to the media frame. In an example of a well trusted cousin, full permission to download media files to the frame can be granted. In another example, the mother's friend can be granted limited permission even to the extent of requiring screening of the material by the system subscriber (son) prior to allowing that content to be downloaded to the media frame. Furthermore, the system subscriber (son) can be allowed to select which types of alerts, if any, would be allowed to be displayed on the media frame.

Figure 2:
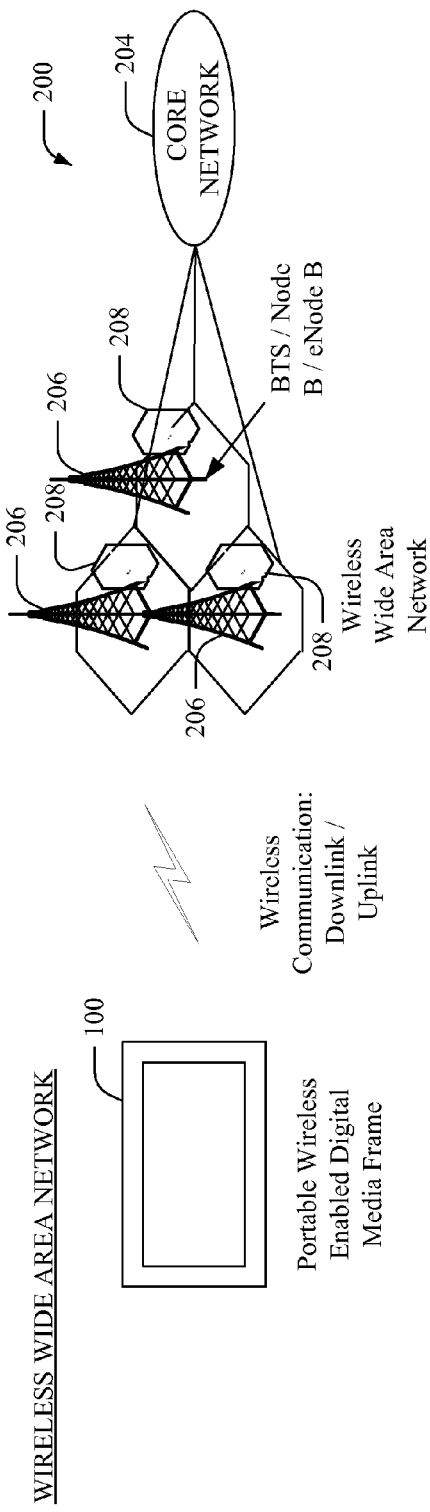
FIG. 2 illustrates example systems that enable a system subscriber to communicate with a portable wireless enabled digital media frame, according to an aspect of the subject innovation.
Figure 2:
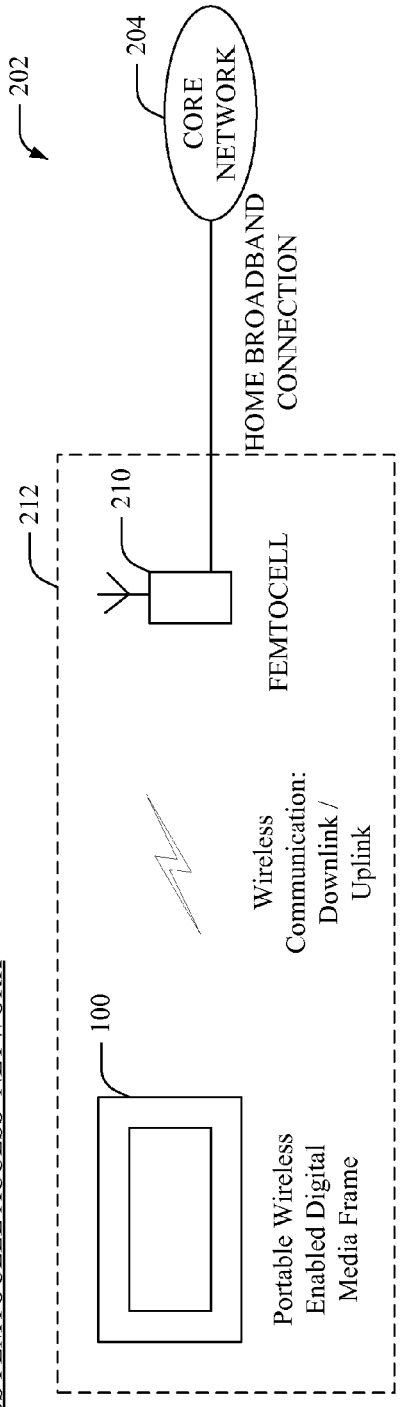

Referring now to FIG. 2, there illustrated is are example systems 200, 202 that enable a system subscriber to communicate with a portable wireless enabled digital media frame, according to an aspect of the subject innovation. System 200 depicts a GSM/GPRS/IP multimedia network architecture that includes a core network 204. The core network 204 is a wide area network (WAN) that includes at least one Base Transceiver Station (BTS) 206 and a Base Station Controller (BSC) 208. The system 100 is a portable wireless enabled digital media frame that can employ a WWAN modem to communicate with the core network 200, 202. Typically, the system 100 can employ a SIM (Subscriber identity Module) or USIM (Universal Subscriber Identity Module). The SIM can include an International Mobile Subscriber Identity (IMSI), which is a unique identifier of a subscriber.

The BTS 206 can be physical equipment, such as a radio tower, that enables a radio interface to communicate with the media frame 100. Each BTS 206 can serve more than one media frame 100. The BSC 208 manages radio resources, including the BTS 206. The BSC 208 can be connected to several BTSs 206. The BSC 208 and BTS 206 components, in combination, are generally referred to as a base station (BSS) or radio access network (RAN). According to an aspect, a system subscriber can connect to the core network 200, 202 by employing a PC, mobile phone, PDA (personal digital assistant), etc. and send media files to the system 100 wirelessly over the WAN. Further, the system subscriber can remotely control and/or manage features of the system 100 over the WAN. The system 100 can receive media files, data and/or commands wirelessly over the WAN. Further, it can be appreciated that the system 100 can also receive media files from any other user connected to the core network 200, 202 that has been authorized by the system subscriber associated with system 100.

Additionally or alternately, system 100 can connect to the core network 202 via a femto cell access point 210. In wireless environment a set of femto cell 212 served by respective femto access points (APs) 210 can be deployed. A femto cell 212 typically covers an area that includes confined area, which is determined, at least in part, by transmission power allocated to femto AP 212, path loss, shadowing, and so forth. While coverage area and confined area typically coincide, it should be appreciated that in certain deployment scenarios, coverage area can include an outdoor portion (e.g., a parking lot, a patio deck, a recreation area such as a swimming pool and nearby space) while confined area spans an enclosed living space. Coverage area typically is spanned by a coverage radius that ranges from 20 to 100 meters. Confined coverage area is generally associated with an indoor space such as a building, either residential (e.g., a house, a condominium, an apartment complex) or business (e.g., a library, a hospital, a retail store), which encompass a setting that can span about 5000 sq. ft.

The femto AP 210 typically serves a few (for example, 1-5) wireless devices (e.g., portable wireless digital media frames 100) within confined coverage area via a wireless link, which encompasses a downlink and an uplink. The system 100 can receive (and/or transmit) data, including media files and/or control commands via the wireless link from the femto AP 210. Typically, the media files and/or control commands can be sent over the core network 202 by a system subscriber and/or a user authorized by the system subscriber.

Figure 3:
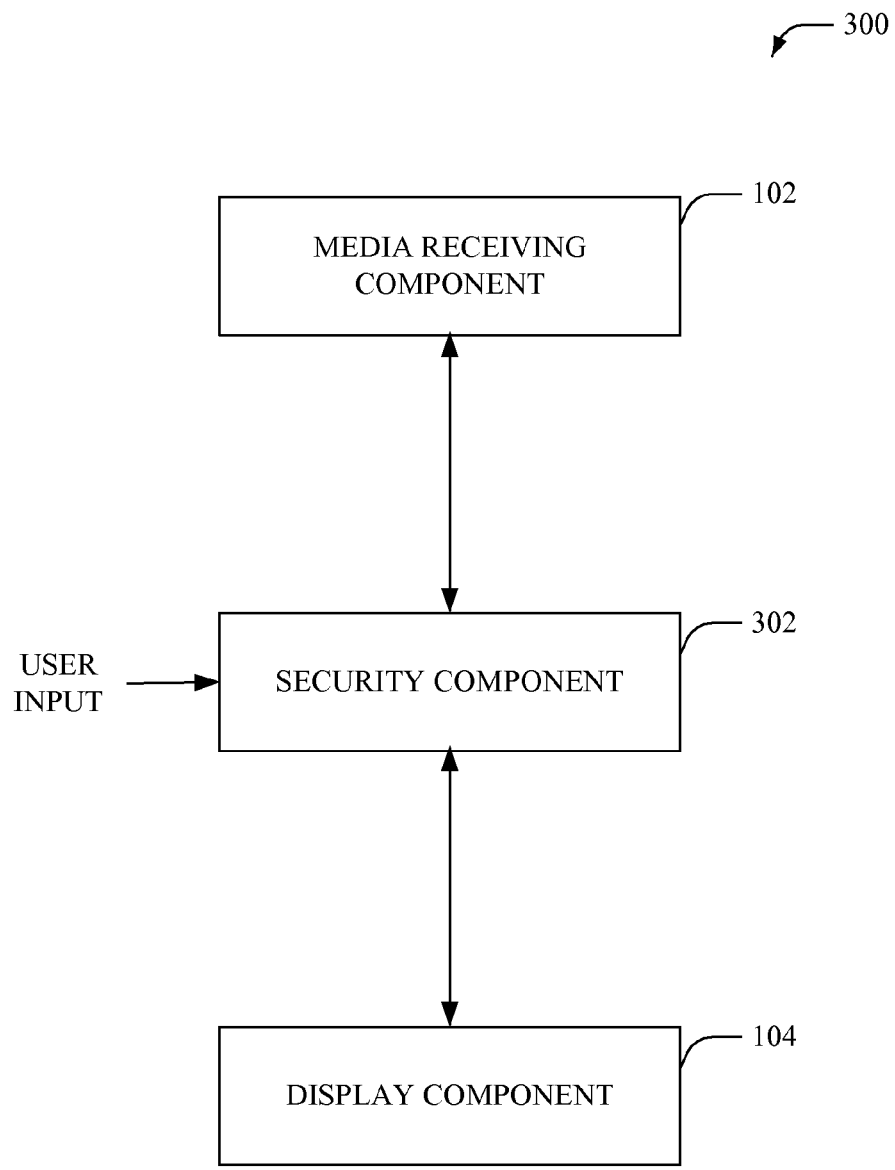
FIG. 3 illustrates an example system that can be employed to prevent receiving media files from unauthorized users in accordance with an aspect of the subject specification.

Referring to FIG. 3, there illustrated is an example system 300 that can be employed to prevent receiving media files from unauthorized users in accordance with an aspect of the subject specification. It can be appreciated that the media receiving component 102 and the display component 104 can include functionality, as more fully described herein, for example, with regard to system 100.

According to an embodiment, system 300 can include a security component 302 that can be employed to perform various security checks on the files downloaded by the media receiving component 102. Specifically, the security component 302 can employ most any technique to prevent malicious attacks. According to one aspect, the security component 302 can receive a user input that defines a list of authorized senders. For example, a system subscriber can send a list of authorized auxiliary users over the WWAN that can be received by media receiving component 102. The security component 302 can store the list in an internal and/or external data store (not shown). Further, the security component 302 can verify that the files downloaded by the media receiving component 102 are sent by an authorized user based on a comparison with the stored list. Media files received from unauthorized users can be blocked and/or deleted and media files received from authorized user can be displayed by the display component 104. In one aspect, the display component 104 can display information associated with the authorized user along with the media file sent by the authorized user. For example, the name of a user sending a video can be displayed on a display screen along with the video sent.

Figure 4:
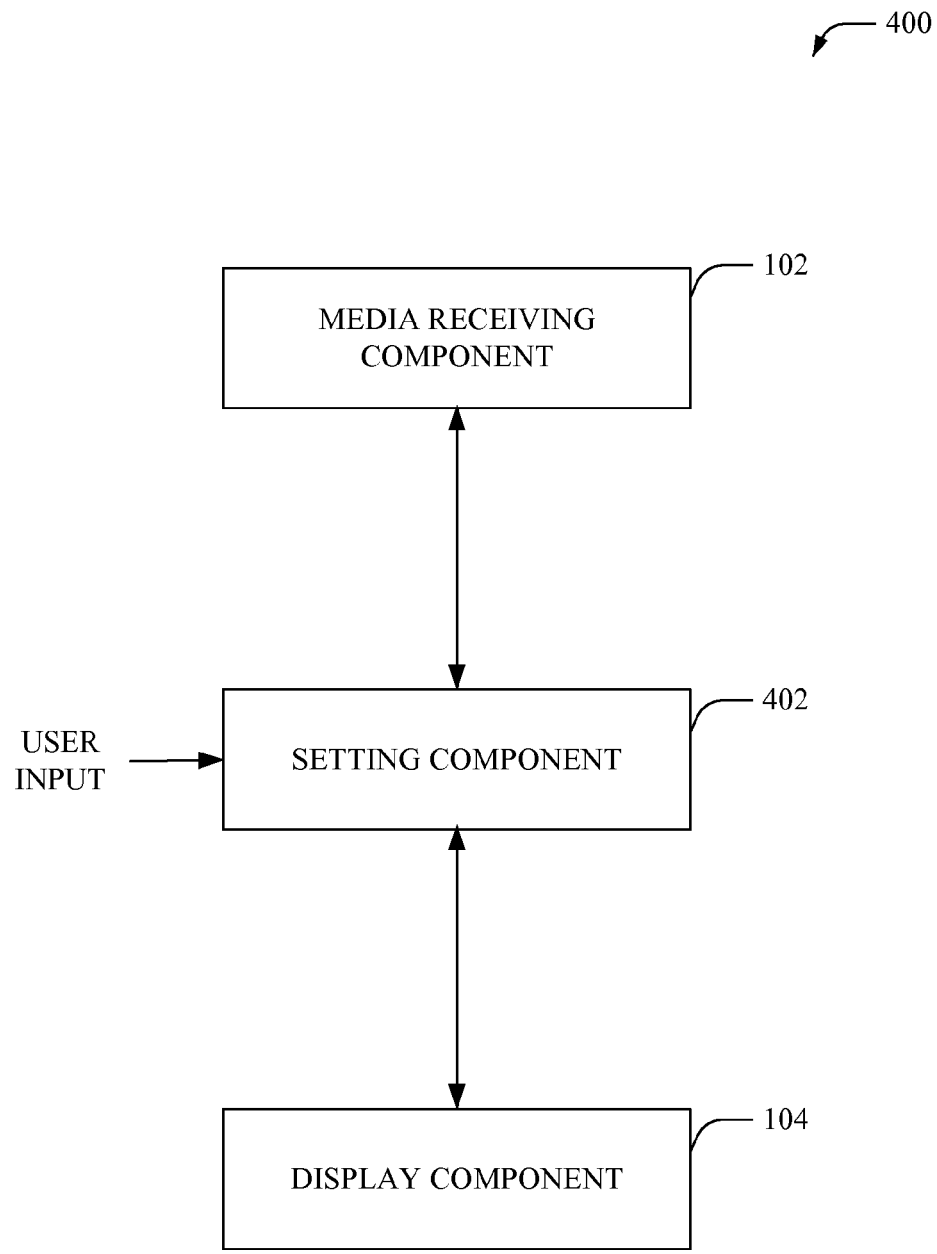
FIG. 4 illustrates an example system that can be employed to receive one or more media files from a wireless wide area network and display the received files based on user preferences in accordance with an aspect of the disclosure.

FIG. 4 illustrates an example system 400 that can be employed to receive one or more media files from a wireless wide area network and display the received files based on user preferences in accordance with an aspect of the disclosure. A media receiving component 102 can be employed to download one or more files sent to the system 400 over the wireless wide area network. Further, a display component 104 can be employed to output the received media files, for example, via a display screen and/or a speaker. It can be appreciated that the media receiving component 102 and the display component 104 can include functionality, as more fully described herein, for example, with regard to systems 100 and 300.

System 400 can include a setting component 402 that enables a user (e.g. system subscriber and/or end user) to predefine various settings of system 400. According to an aspect, settings can be received (e.g. by the media receiving component 102) to modify the current setting of system 400. For example, a son (system subscriber) can change the settings on a wireless enabled digital media frame employing system 400 that he has gifted to his mother (end user), from a remote location by employing his PC or mobile device (e.g. cellular phone, personal digital assistant, etc.) via the WWAN. Further, the mother can also change the settings via most any input device, such as but not limited to, a touch screen, keypad, mouse, click wheel, etc. Thus, user input can include input from a system subscriber and/or input from a recipient user. Based on the user input, the setting component 402 can enable the user to switch between display modes, and/or create a custom display mode. As an example, a user can choose between a browse mode and a slideshow mode. When a browse mode is selected, the setting component 402 can allow the user to manually scroll through the received media files. Alternately, when a slideshow mode is selected, the setting component 402 can activate a slideshow to output the received media files one after another. The setting component 402 can also enable a user to specify a shuffle setting that can output the media files in a random order. Further, the setting component 402 can allow a user to customize a slideshow by specifying the media files that are in a show and/or the order in which they appear. Furthermore, the setting component 402 can also enable a user to specify transition effects and/or display times in the slideshow.

In accordance with an aspect, the setting component 402 can be employed to configure the settings of an output device, for example, a display screen, a speaker, etc. The setting component 402 can adjust screen brightness, color and/or contrast based on a user's preference. Further, volume settings of a speaker can be changed by the setting component 402 as specified by a user. Further, the setting component 402 can also enable a user to specify a location of text, messages, warning symbols, signal strength indicator, and/or widgets on the display. In addition, the setting component 402 can be employed to predefine a downloading schedule for the media receiving component 102. Based on the schedule, the media receiving component 102 can receive new media files sent to the system 400.

According to an aspect, a user can employ the setting component 402 to apply preferences to a digital image received by the media receiving component 102, such as but not limited to, adding masks and/or borders and/or applying special effects (e.g. convert a colored picture to sepia or black and white). Further, the user can employ the setting component 402 to modify the received pictures, such as, rotate, copy, crop, delete a photograph and/or tag the photograph with text or an audio clip. In one example, the end user can employ a microphone to enter an audio clip and/or employ a stylus on a touch screen to enter a handwritten note, and/or enter text and associated one or more media files with the audio clip, handwritten note, and/or text. It can be appreciated that the system subscriber can also associate a tag, including an audio clip, handwritten note and/or text with a media file over the WWAN. According to an aspect, the media files stored in system 400 can be managed (e.g. load file, delete file, etc.) by a remote authorized user (e.g. system subscriber) over the WWAN.

Figure 5:
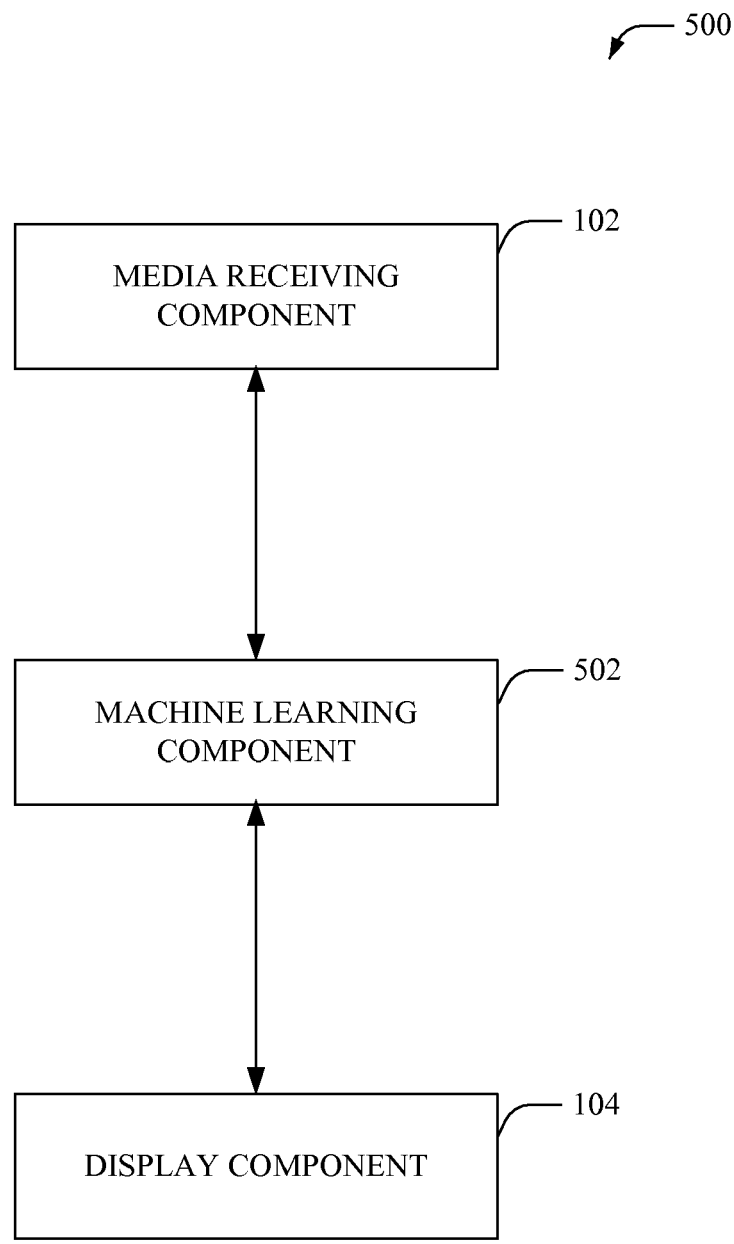
FIG. 5 illustrates an example system that facilitates automating one or more features in accordance with the subject innovation.

Referring now to FIG. 5, there illustrated is an example system 500 that employs an machine learning component 502 that facilitates automating one or more features in accordance with the subject innovation. It can be appreciated that the media receiving component 102 and the display component 104 can each include their respective functionality, as more fully described herein, for example, with regard to systems 100, 300 and 400.

The subject innovation (e.g., in connection with selection of one or more system features) can employ various AI-based schemes for carrying out various aspects thereof. For example, a process for determining when the media receiving component 102 can schedule a download can be facilitated via an automatic classifier system and process. As another example, a process for selecting media files that can be displayed by the display component 104 can be facilitated via an automatic classifier system and process. Moreover, the classifier can be employed to determine selection of system setting (e.g. settings modified by the setting component 402).

A classifier is a function that maps an input attribute vector, $x=(x1, X2, x3, x4, xn)$, to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of the subject system 500, for example, attributes can be information associated with a media file (e.g. tags, name of the sender, timestamps) or other data-specific attributes derived from the information, and the classes can be categories or areas of interest (e.g., levels of priorities, preferences).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria.

Figure 6:
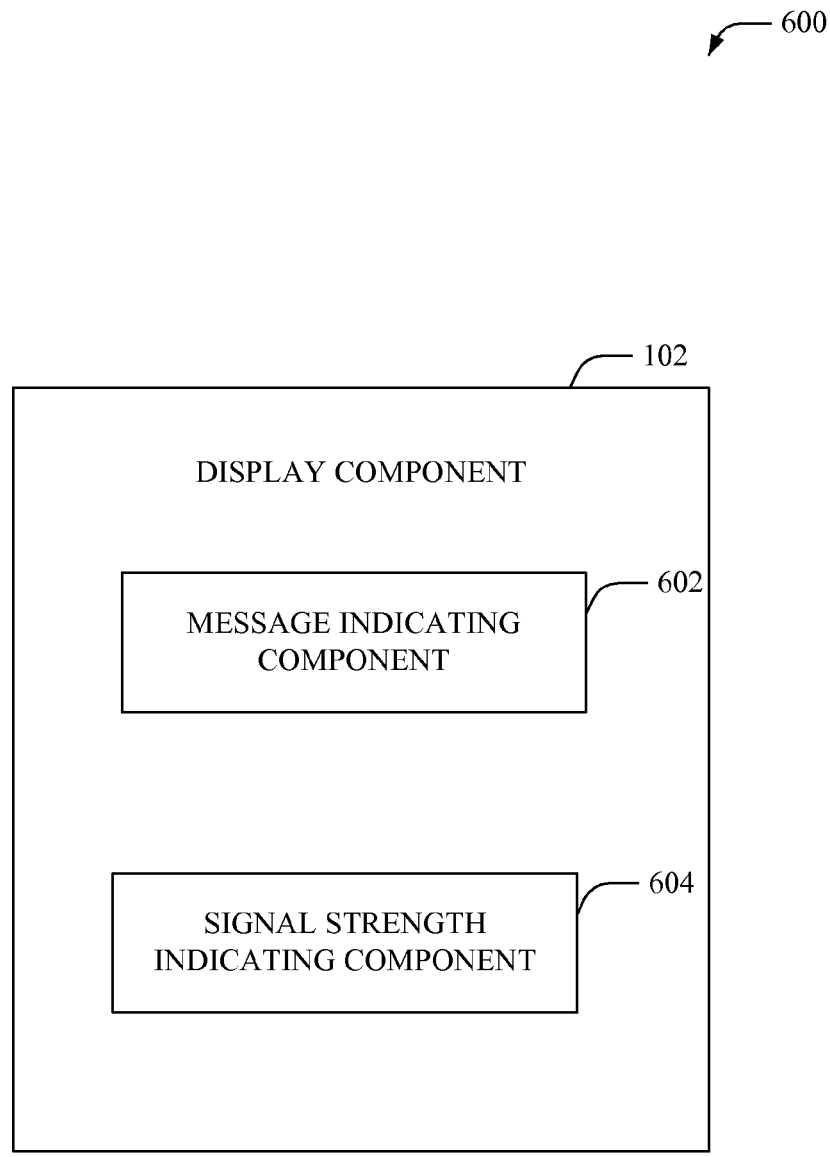
FIG. 6 illustrates an example system that can display symbols to alert an end user, according to an aspect of the subject innovation.

Referring now to FIG. 6, there illustrated is an example display system 600 that can display various messages for an end user, according to an aspect of the subject innovation. Typically, the system 600 includes display component 104 that can output received digital media to an end user. For example, the display component 104 can display a digital picture on a display screen (e.g. LCD screen), play a video on the screen and/or output an audio file via a speaker. It can be appreciated that the display component 104 can include functionality, as more fully described herein, for example, with regard to systems 100, 300, 400 and 500.

The display component 104 can include a message indicating component 602. As an example, if a broadcast warning alert is received (e.g. by a media receiving component 102) over the WWAN, the message indicating component 602 can display the alert to the end user. Additionally or alternately, the message indicating component 602 can output an audio alarm via a speaker. According to an aspect, the message indicating component 602 can superimpose a warning symbol and/or text associated with a received message (e.g. an alert) over the currently display image or video. Further, the location of the warning symbol can be based on manually entered or automatically determined user preferences. For example, the warning symbol can be located on the top left corner of the display screen. Further, the warning symbol can be flashing and/or accompanied with an audio alert for faster identification. In another aspect, the message indicating component 602 can interrupt a video/audio or stop displaying the digital image and display only a warning message on the display screen, until the warning is in effect.

It can be appreciated that the message indicating component 602 can present a received message, such as a warning alert, to a user in various ways. In one aspect, the warning alert can be indicated by a symbol. For example, a black cloud and or lightning symbol can be displayed to indicate a thunderstorm advisory. Further, the message indicating component 602 can determine that the warning is no longer in effect and can accordingly stop displaying the warning alert. For example, if the thunderstorm advisory has been called off, the message indicating component 602 can stop displaying the warning symbol.

A signal strength indicating component 604 can be employed to display current signal strength. The strength of the signal is based on the WWAN coverage area. According to an aspect, the signal strength indicating component 604 can superimpose a signal strength symbol that illustrates the current signal strength, on the currently displayed digital picture or video. It can be appreciated that most any signal strength symbol can be employed, for example, a set of bars can utilized to depict the current signal strength. A large number of bars can indicate presence of a strong signal and a fewer number of bars can indicate presence of a weaker signal.

According to another aspect, the signal strength indicating component 604 can employ one or more LEDs (light emitting diodes) or other types of display to show signal strength. Moreover, the signal strength indicating component 604 can display the signal strength, when the current signal strength is low. For example, the signal strength indicating component 604 can determine when the current signal strength is below a predefined threshold and display a low signal indication. It can be appreciated that a manufacturer or a user can predefine the threshold or it can be automatically set. As an example, in a house environment, if low signal strength is indicated in one room, the recipient can move the system closer to a window or upstairs area.

FIG. 7 illustrates example digital media frames that employ a wireless wide area network modem in accordance with an aspect of the disclosed subject matter. It can be appreciated that although only two digital media frames (700-702) have been illustrated in FIG. 7A-7B, various combinations of frames, mats and/or displays can be employed. FIG. 7A depicts a digital media frame 700 that employs an internal or external wireless wide area network modem to receive media files from a WWAN. Typically, the digital media frame 700 comprises a frame 704, a matt 706 and a display screen 708.

The frame 704 can be made of most any material, such as but not limited to, wood, metal and/or plastic. Although the frame 704 is depicted as a rectangular frame, it can be appreciated that the frame 704 can be most any shape or size. For example, the frame 704 can be square, round, oval, etc. A mat 706 can be optionally employed within the frame 704. The mat 706 can also be of most any shape or size based on the shapes and sizes of the frame 704 and/or the display 710. It can be appreciated that interchangeable frames 704 and/or mats 706 of different colors, shapes or materials can be employed to change the look of the digital media frame 700. Further, the frame 704 can be mounted on a wall and/or placed on a surface by employing mounts and/or a stand (not shown) attached to the back of frame 704.

In one example, the display screen 708 can be an LCD screen. It can be appreciated that the display screen 708 can employ most any resolution, such as but not limited to, 640× 480, 800×600, 1024×768 and/or 1280×1024. Further, the display screen 708 can employ various display technologies, for example, an active matrix thin film transistor (TFT) can be employed. The display 708 can display one or more media files received from the WWAN in either a portrait or a landscape orientation. Additionally, when the frame 700 is rotated to another position, the pictures can automatically adjust orientation (e.g. by employing a display component 104).

According to an aspect, the display screen 708 can be a single or multiple touch screen display. The touch sensitive display screen 708 can provide end users an easy and effective means of communication with the digital photo frame 700. One or more sensors (not shown) can be provided under the display screen 708 to detect when a user touches the display 708. The sensors can be skin conductivity sensors, pressure sensors, multi touch sensors, optical sensors, thermal sensors and/or a combination thereof. The sensors can collect data that can determine when an end user is touching the display screen 708 and a location at which the end user is touching the screen 708.

FIG. 7B illustrates a different type of digital media frame 702 that receives media files from a WWAN and can concurrently display two or more media files, such as, digital pictures and/or videos. It can be appreciated that although only three displays (710-712) are depicted in the figure, one or more displays can be employed. Further, the frame 704 and mat 706 can include features and characteristics described with respect to the frame 704 and mat 706 of FIG. 7A. Furthermore, displays (710-712) can each include features and functionality described with respect to the display 708 of FIG. 7A.

According to an aspect, the display 710 can display media files that have a portrait orientation and the display 712 can display media files that have a landscape orientation. Further, a user (e.g. a system subscriber and/or end user) can select a display screen of the available displays (710-712) to display the most recently downloaded media files. For example, the user can select display 710 to display the most recently downloaded pictures. Thus, when one or more pictures are downloaded from the WWAN, they can be displayed, for example, as a slideshow, in display 710, while the older pictures can be displayed in displays 712. Further, newly downloaded media files can be output more often and/or for a longer time than the older files. Additionally or alternatively, an audio alarm via a speaker 714 can be output that indicates new media files have been downloaded. For example, a user selected ring tone can be employed to indicate a new set of media files have been received. Moreover most any indication, such as, but not limited to, a flashing display, can also be employed to indicate newly arrived media files.

Additionally, the speaker 714 can output received audio files. The digital media frames 700-702 can support various audio file formats, for example MP3 (MPEG-1 Audio Layer 3) format. The audio file can be associated with an image or video and can be played each time the image or video is displayed. Further, the speaker 714 can be employed to output alerts to a user that indicate a warning message, low signal strength, etc. Further, the digital media frames 700-702 can include a microphone 716 that can be employed to receive input from an end user. As an example, the end user can enter an audio clip via the microphone 716 and tag a picture with the entered audio clip.

According to an aspect, the end user can employ the microphone 716 to transmit audio data over the WWAN during a voice call. Moreover, a voice call can be initiated by an end user or a system subscriber (or other authorized user). For example, the system subscriber can remotely control the display screen (e.g. loading a particular set of media files) and talk to an end user regarding the currently displayed media file. Further, the digital media frames 700-702 can also include an 'answer call' button (hard key) and/or provide an icon (not shown) on a touch screen (708, 710, 712) that can be pressed and/or touched by an end user to answer an incoming call and establish a voice connection with the caller (e.g. system subscriber or other authorized user) over the WWAN. The voice call can be terminated by pressing or touching a 'disconnect call' button or icon (not shown).

Typically, the digital media frames 700, 702 can be given as gifts to friends and family. The friend or family member would not be required to have a wireless network subscription with wireless operator or to manage the wireless account, but would have to be in a wireless coverage area. This would alleviate the issue of the end user needing to a PC or of needing understand the technical details behind this system. Since the end user device would typically be used in a fixed or static location, non mobile, the address of the family or friend could be checked to determine if they are in a wireless network coverage area.

Figure 8:
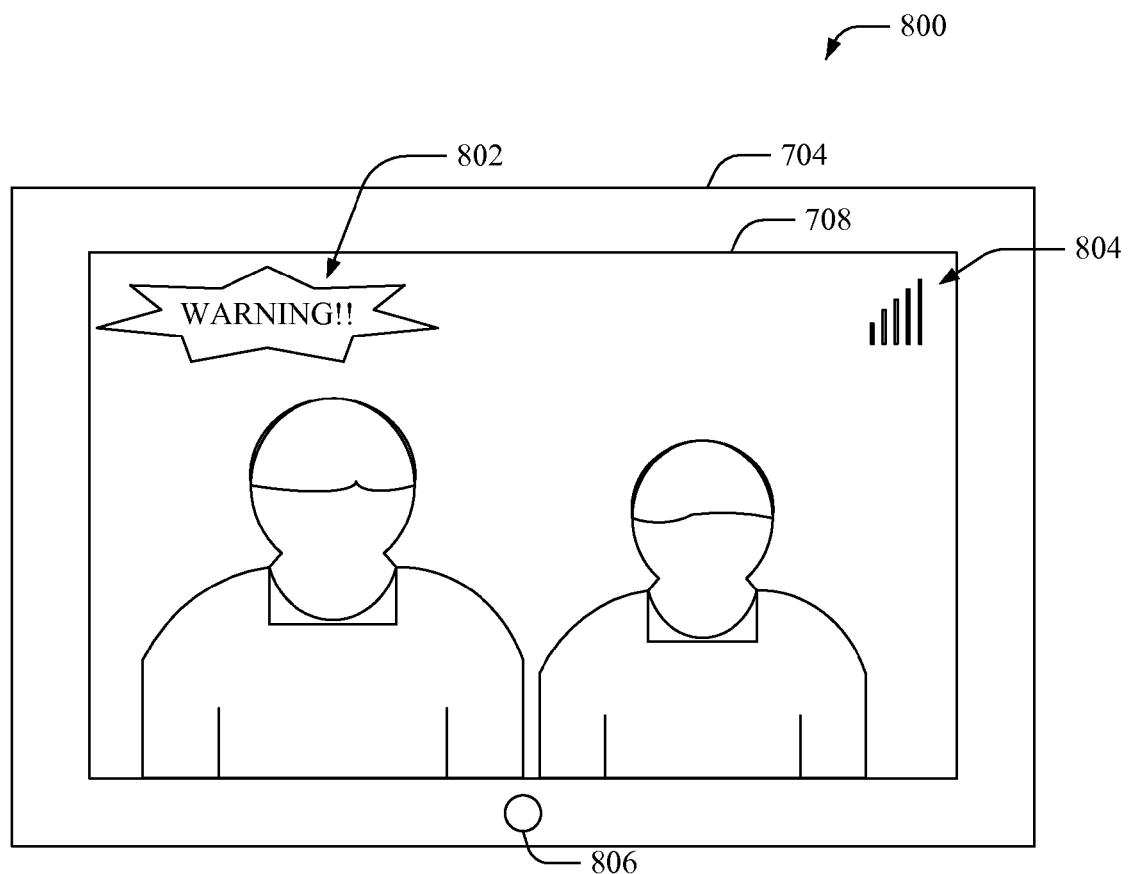
FIG. 8 illustrates a wireless enabled digital media frame that displays warning indicators to an end user, according to an aspect of the disclosed subject innovation.

FIG. 8 illustrates an example wireless enabled digital media frame 800 that displays warning indicators to an end user, according to an aspect of the disclosed subject innovation. Specifically, the wireless enabled digital media frame 800 can include a WWAN data modem (e.g. a 2G/2.5/3/3.5/4 G data modem operating in 850, 1900, 700, AWS, WCS spectrum bands). Further, it can be appreciated that the digital media frame 800 can include features and functionality, as more fully described herein, for example, with regard to digital media frames 700 and 702.

According to an aspect, the digital media frame 800 can receive broadcast messages, such as, but not limited to emergency alerts and/or weather alerts over the WWAN. When the digital media frame 800 receives such a broadcast message, a warning symbol 802 can be displayed on the display screen 708. Additionally or alternatively, an audio alarm can also be output via a speaker. According to an aspect, the warning symbol 802 can be displayed along with text associated with the received broadcasted message and can be superimposed over the currently displayed image or video. Although the warning symbol 802 is illustrated at the top left corner of the display screen 708 in FIG. 8, it can be appreciated that the location of the warning symbol can be most anywhere on the display screen 708 and can be manually entered or automatically determined. Further, the warning symbol 802 can be flashing and/or accompanied with an audio alert for faster identification. In another aspect, the warning symbol 802 can be displayed over the entire display screen 708 while the warning is in effect and/or until the user views the warning. For example, one receiving a thunderstorm warning, the digital media frame 800 can display a warning message on the display screen 708 until the end user views the message. On receiving an indication that the end user has viewed the warning message, the digital media frame 800 can minimize the warning message and continue to display downloaded media files.

In addition, the digital media frame 800 can display the current signal strength on the display 708. In particular, the strength of the signal is based on the WWAN coverage area. According to an aspect, a signal strength symbol 804 that illustrates the current signal strength can be superimposed on the currently displayed digital picture or video. As one example, the signal strength symbol 804 can be depicted as a set of bars as shown in FIG. 8. A large number of bars can indicate presence of a strong signal while a fewer number of bars can indicate presence of a weaker signal. However, it can be appreciated that any other type of symbol and/or icon can be displayed to indicate current signal strength. If low signal strength is indicated by symbol 804, the end user can move the digital media frame 800 to another location where the signal strength is higher to enable faster downloads. Additionally or alternatively, an LED (light emitting diode) 806 can also be employed to indicate signal strength. For example, the LED 806 can be switched on when the signal strength is low and switched off when the signal strength is satisfactory (or vice versa).

Figure 9:
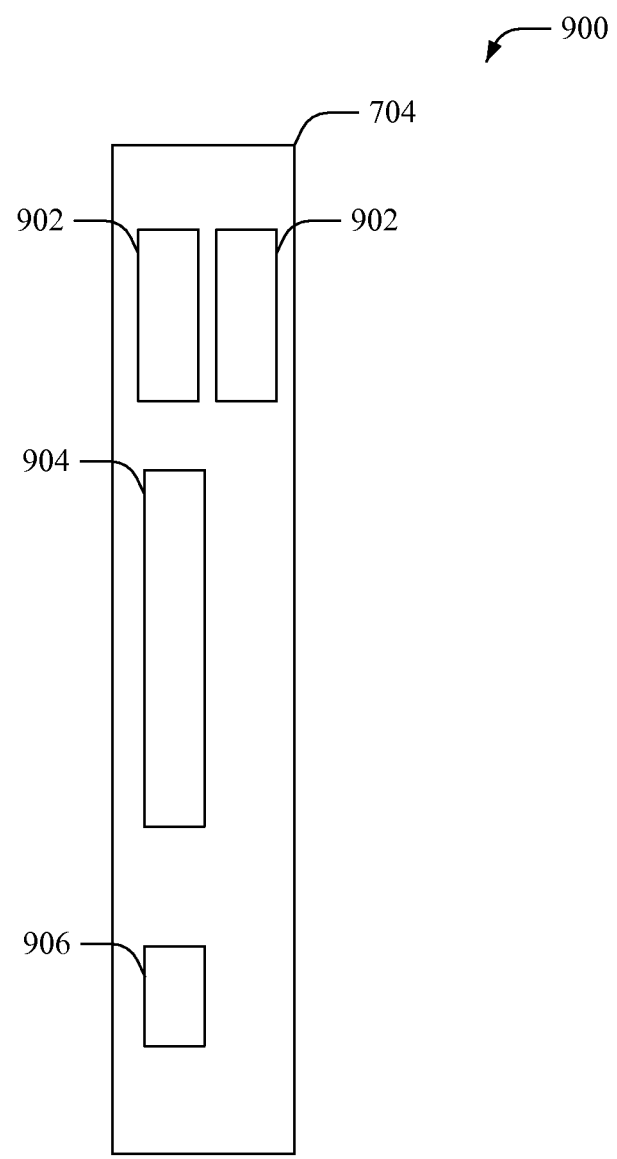
FIG. 9 illustrates a side view of a wireless enabled digital media frame, according to an aspect of the subject innovation.

Referring to FIG. 9, illustrates a side view of a wireless enabled digital media frame 900, according to an aspect of the subject innovation. The wireless enabled digital media frame 900 can receive media files over a wireless wide area network as described more fully described herein, for example, with regard to digital media frames 700, 702 and 800. Specifically, the digital media frame 900 can include WWAN data modem such as but not limited to GPRS/EDGE/CDMA/UMTS/HSPA/LTE such that the digital images can be transferred to the media frame using a wireless connection (e.g. 2G/3G/3.5G/4G).

In addition to receiving media files over the WWAN, the digital media frame 900 can receive media files via one or more memory cards, USB (Universal Serial Bus) ports, a phone line connection, internet connection, Wi-Fi connection, Bluetooth® and/or the like. According to an aspect, the digital media frame 900 can include one or more USB ports 902, for example, that can receive media files from a PC. A USB cable can be employed to connect the digital media frame 900 via the USB port 902 to a computer and images, videos and/or audio files can be transferred to the digital media frame 900 from the computer.

The digital media frame 900 can further include one or more slots 904 for directly inserting memory cards. As an example, a user can click a picture using a digital camera and display the picture on the digital media frame 900 by inserting the memory card from the camera into the slot 904. It can be appreciated that the digital media frame can include slots for most any type of memory card, such as but not limited to SD (Secure Digital) card, Compact Flash card, etc. Additionally or alternately, a phone line connection can be established by the digital media frame 900 via a phone jack 906. The phone line connection can enable a user to plug the frame 900 into a phone jack and download any photos by employing a dial up modem to access a website. Although, the slots 902-906 are illustrated on the side of the wireless enabled digital media frame, it can be appreciated that the slots can be located anywhere on the device.

Figure 10:
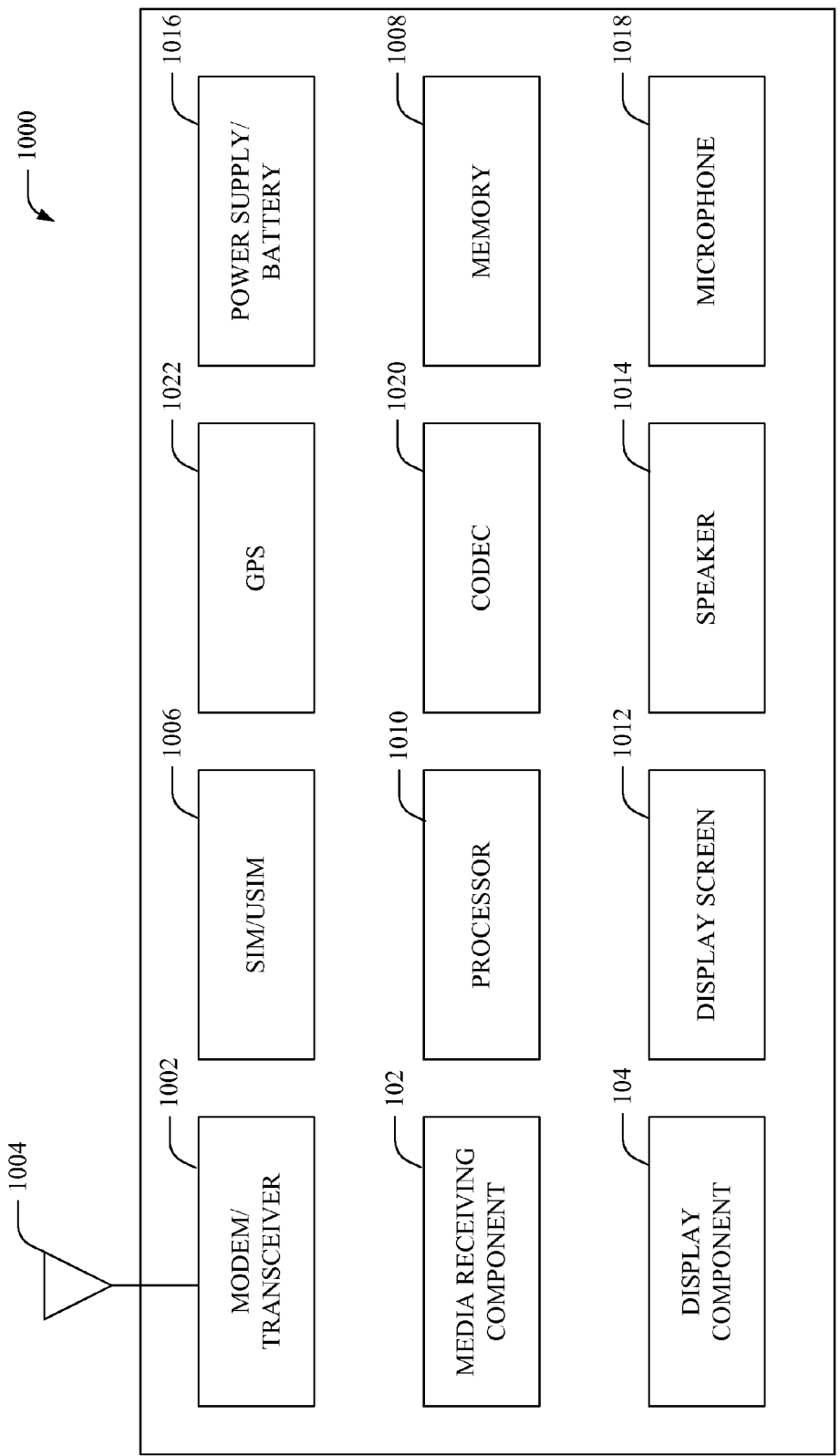
FIG. 10 illustrates an example system that displays media files received over a WWAN in accordance with an aspect of the subject innovation.

FIG. 10 illustrates an example system 1000 that displays media files received over a WWAN in accordance with an aspect of the subject innovation. The system 1000 can include a modem 1002 that can wirelessly communicate with a wide area network, for example, employing a 2G/3G/3.5G/4G wireless connection. As an example, the modem 1002 can be a wireless wide area network (WWAN) modem/transceiver such as a GPRS/EDGE/CDMA/UMTS/HSPA/LTE modem that can transfer digital images (or other media files) and/or control data to the system 1000 using a 2G/3G/3.5G/4G or other wireless connection. Moreover, the modem 1002 can operate in any of the commonly used wireless spectrum bands. As an example, the modem 1002 can be IPv6 (Internet Protocol version 6) enabled. It can be appreciated that the modem 1002 can be embedded in the system 1000 or external to the system 1000 and can be connected to an antenna 1004 to receive and/or transmit data. The antenna 1004 can be external or internal. Moreover, the modem 1002 can receive instructions sent by a remote user (e.g. system subscriber) over the WWAN to change one or more settings and/or perform one or more functions on the system 1000, for example, load, delete or play a file. Furthermore, the modem 1002 can also be configured to receive wireless emergency alerts (SMS, Image)/broadcast from the WWAN. Additionally, the system 1000 can include a SIM (Subscriber Identity Module) or USIM (Universal Subscriber Identity Module) 1006 associated with the system users account subscription. The SIM or USIM 1006 can be prepaid, flat rate monthly, or usage based. Further, the SIM or USIM 1006 may need to be a locked to the specific type of device (e.g. a portable digital media frame that employs a WWAN modem) to prevent it from being used in a mobile phone or wireless data device to prevent network abuse if lower rates, including flat rate, are offered to the system subscribers.

The media receiving component 102 can receive media files sent to the system 1000 over the WWAN via the modem 1002. The media receiving component 102 and display component 104 depicted in FIG. 10, can each include their respective functionality, as more fully described herein, for example, with regard to systems 100, 300, 400, 500 and 600. The system 1000 is employed in a digital media frame to display images transferred over the WWAN. The modem 1002 can include control functions to enable communication with the WWAN and transfer of data in the downlink. The modem 1002 can be downlink enabled and can optionally allow the ability to transfer data in the uplink (UL) direction beyond control channels. For example, the system 1000 can transfer data associated with available free space in memory 1008 to the WAN in the UL. Further, the modem 1002 can be configured to allow network control such that transfer of data (scheduling) could occur at various times of the day based on network/sector loading due to traffic and propagation conditions and/or based on user preferences. Further, the modem 1002 can be configured to work on a prepaid condition or active account or unlimited usage account.

The system 1000 can typically include a processor 1010 that can be a processor based controller chip to control the system 1000. Specifically, the processor 1010 can be a processor dedicated to analyzing information received by modem 1002 and/or generating information for transmission on the UL, a processor that controls one or more components of system 1000, a processor that facilitates output of media files on a display screen 1012 or via speaker 1014, and/or a processor that both analyzes information received by modem 1002, generates information for transmission on the UL, controls one or more components of system 1000 and facilitates output of media files on a display screen 1012 or via speaker 1014.

System 1000 can additionally comprise memory 1008 that is operatively coupled to processor 1010 and that can store data to be transmitted, received data, data associated with analyzed signal and/or interference strength, information related to an assigned channel, power, rate, or the like, and any other suitable information for estimating a channel and communicating via the channel. Memory 1008 can additionally store media files received from a sender over the WWAN. Further, memory 1008 can also store user preferences and/or predefined user settings. In one example, memory 1008 can be partitioned, such that locally downloaded media files (e.g. downloaded by an end user) are stored in one partition and remotely downloaded media files (e.g. received over the WWAN) are stored in another partition. A number of program modules can be stored in the memory 1008, including an operating system, one or more application programs, other program modules and/or program data. It is appreciated that the specification can be implemented with various commercially available operating systems or combinations of operating systems.

It will be appreciated that the memory 1008 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory. It can be appreciated that the description of memory 1008 above refers to internal and/or external memory such as, but not limited to, various types of media which are readable by a computer, such as zip drives, magnetic cassettes, flash memory cards, cartridges, and the like, may also be used in the example operating environment, and further, that any such media may contain computer-executable instructions for performing the methods of the specification.

Additionally, a system bus (not shown) can be employed to couple system components including, but not limited to, the system memory 1008 to the processor 1010. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 1012 and/or audio files can be played via the speaker 1014. It can be appreciated that the media files stored in the memory 1008 can also be received via ports such as, but not limited to, USB, USB2, 1395, SD card, Compact Flash, etc. Additionally, system 1000 can include a power supply/battery 1016 that can be employed to power the system 1000. As an example, power management techniques can be employed to save battery power, such that the battery can last longer between recharge cycles.

An end user can enter commands and information into the system 1000 through one or more wired/wireless input devices, e.g., a keyboard, a pointing device, such as a mouse and/or a touch screen display 1012. A microphone 1018 can also be employed to enter data. For example, the end user can employ the microphone 1018 to enter an audio clip associated with an image. These and other input devices are often connected to the processor 1010 through an input device interface (not shown) that is coupled to a system bus, but can be connected by other interfaces, such as a parallel port, an IEEE 1394 serial port, a game port, a USB port, an IR interface, etc.

The system 1000 can further include a codec 1020 that can be employed encode and/or decode digital data. The codec 1020 can employ most any compression and/or decompression algorithm to compress/decompress a received media file. Furthermore, the system 1000 can include a GPS (global positioning system) 1022 that can be employed to determine the current geographical coordinates of the system 1000. The GPS 1022 can include a separate GPS antenna (not shown) or employ the antenna 1004 to communicate with a GPS satellite. In one example, the system 1000 can receive broadcast warnings, emergency alerts, weather alerts, etc. based on the current coordinates.

In addition, the system 1000 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
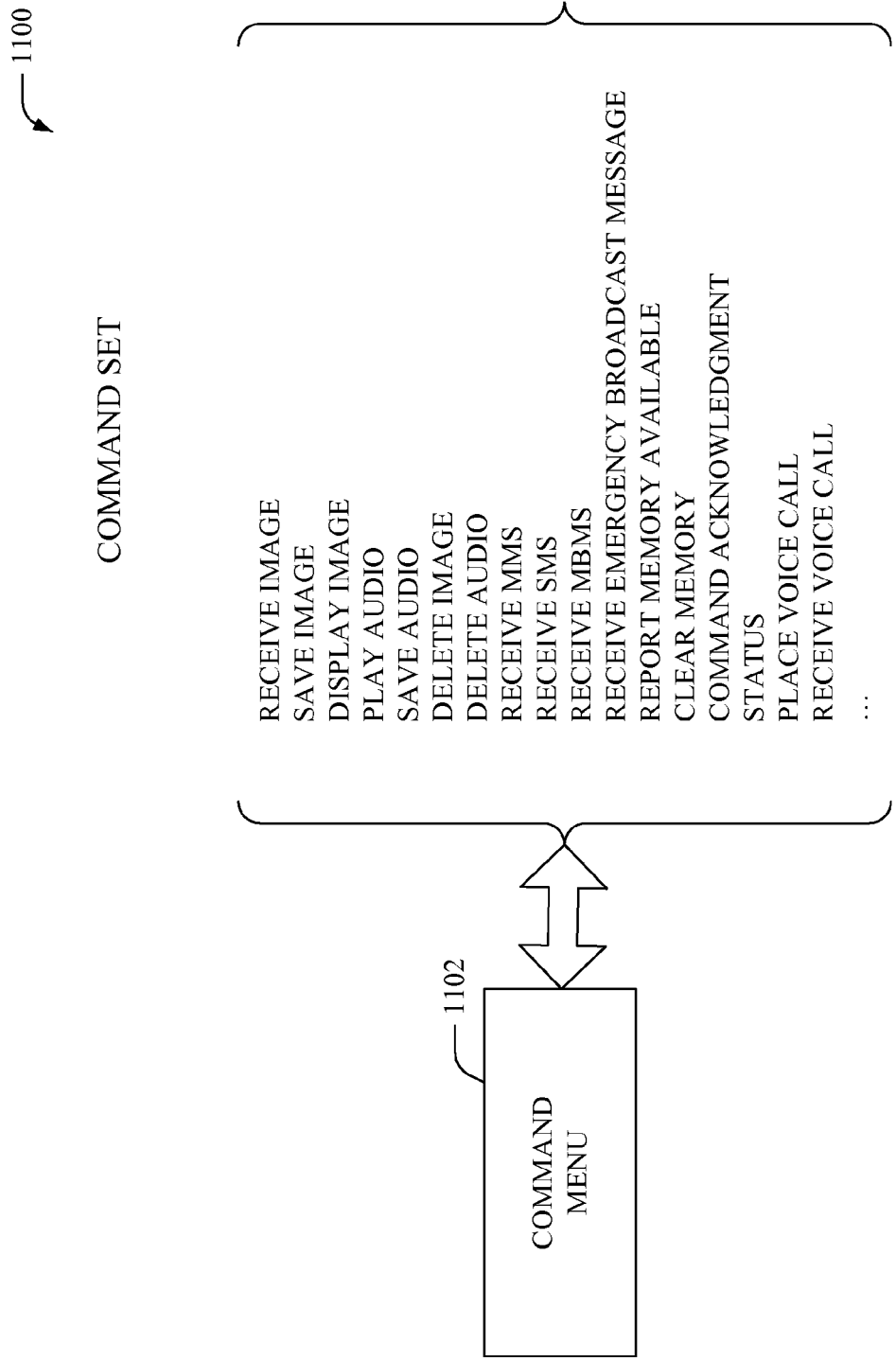
FIG. 11 illustrates an example set of commands that can be performed by a portable wireless enabled media frame, according to an aspect of the subject disclosure.

Referring to FIG. 11, illustrated is an example set of commands 1100 that can be performed by a portable wireless enabled media frame, according to an aspect of the subject disclosure. Moreover, a system subscriber can send one or more system commands over the WWAN to control the features of portable wireless enabled media frame, such as but not limited to, media display management and/or scheduling features.

Typically, the portable wireless enabled media frame can include a command menu 1102 that can comprise a set of available commands performed by the media frame. An example set of commands are shown below, however, it can be appreciated that most any commands to control and/or monitor media frame features can be employed:

receive image
save image
display image
play audio
save image
save audio
delete image
delete audio
receive mms
receive sms
receive mbms
receive emergency broadcast message
report memory available
clear memory
command acknowledgment
status
place voice call
receive voice call As an example, a son (system subscriber) who has bought the portable wireless enabled media frame for his mother (end user) can send one or more commands over a WWAN via a mobile device and/or PC to remotely control the portable wireless enabled media frame, such that the mother can easily view media files without operating the media frame. In one aspect, the son can select a subset of commands that can be performed locally by the mother. For example, the mother can be allowed to enter a command via most any input device connected to the portable wireless enabled media frame, for example, to delete pictures, display her favorite pictures more often, etc.

FIGS. 12-15 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 12:
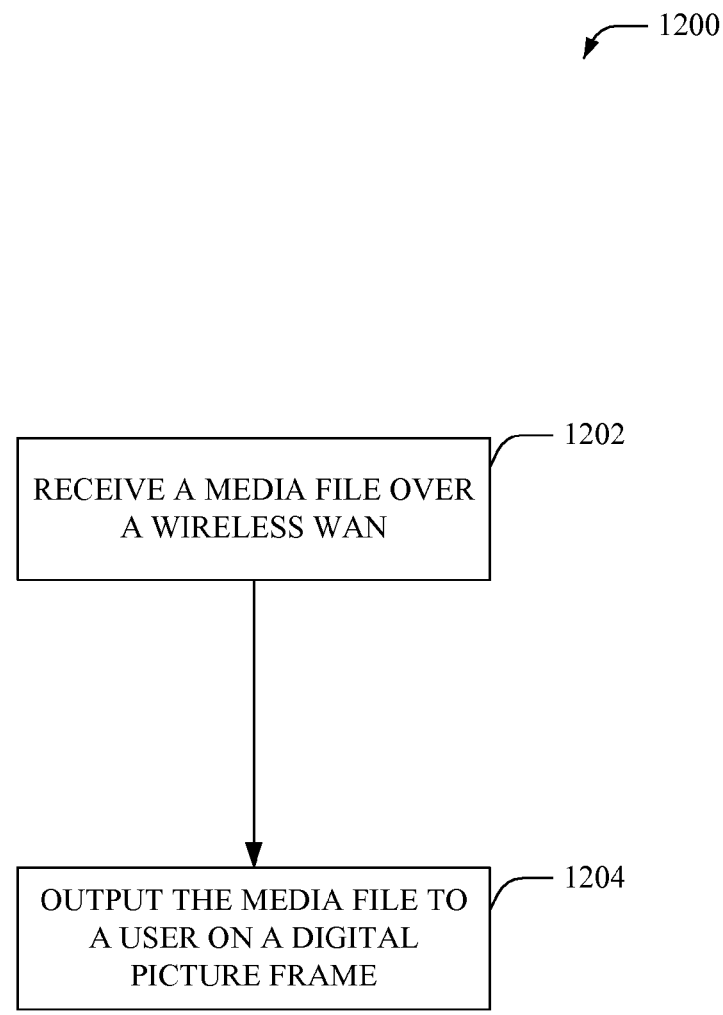
FIG. 12 illustrates an example methodology that can be employed to output media files received over a WWAN in accordance with an aspect of the subject disclosure.

Referring now to FIG. 12, illustrated is an example methodology 1200 that can be employed to output media files received over a WWAN in accordance with an aspect of the subject disclosure. At 1202, a media file can be received wirelessly over a WWAN. The media file can be sent by one of a set of authorized users and can include a digital image, video, audio or a combination thereof. For example, a video clip sent by a friend and/or family member to an end user can be received over a WWAN. According to an aspect, the media file can be sent by a system subscriber wherein the system subscriber can be a mobile subscriber or even a non-mobile user or subscriber to a competitor's network who subscribes separately to transfer media to an end user. Further, the media file can be received from a mobile wireless network, such as but not limited to a 2G or 3G network on which the system subscriber has transferred multimedia content. In addition to the media file, preference information can also be received.

At 1204, the media file can be output to the end user, for example on a digital media frame. According to an aspect, pictures and/or videos can be displayed on a display screen (e.g. LCD screen) while audio clips can be played via one or more speakers. According to an aspect, a location on the display screen can be determined where the received media can be displayed. For example, text information associated with a received picture can be superimposed on the image or placed at the bottom of the display screen. Further, a received picture and/or video can be displayed based on its format (e.g. landscape or portrait). Furthermore, multiple images, data, videos and/or audio can be output as a slide show. The settings for the slide show can be user defined, for example by the receiver or sender, and/or automatically determined by a machine learning technique. According to one aspect, the most recently downloaded media files can be displayed for a longer period than the older files.

Figure 13:
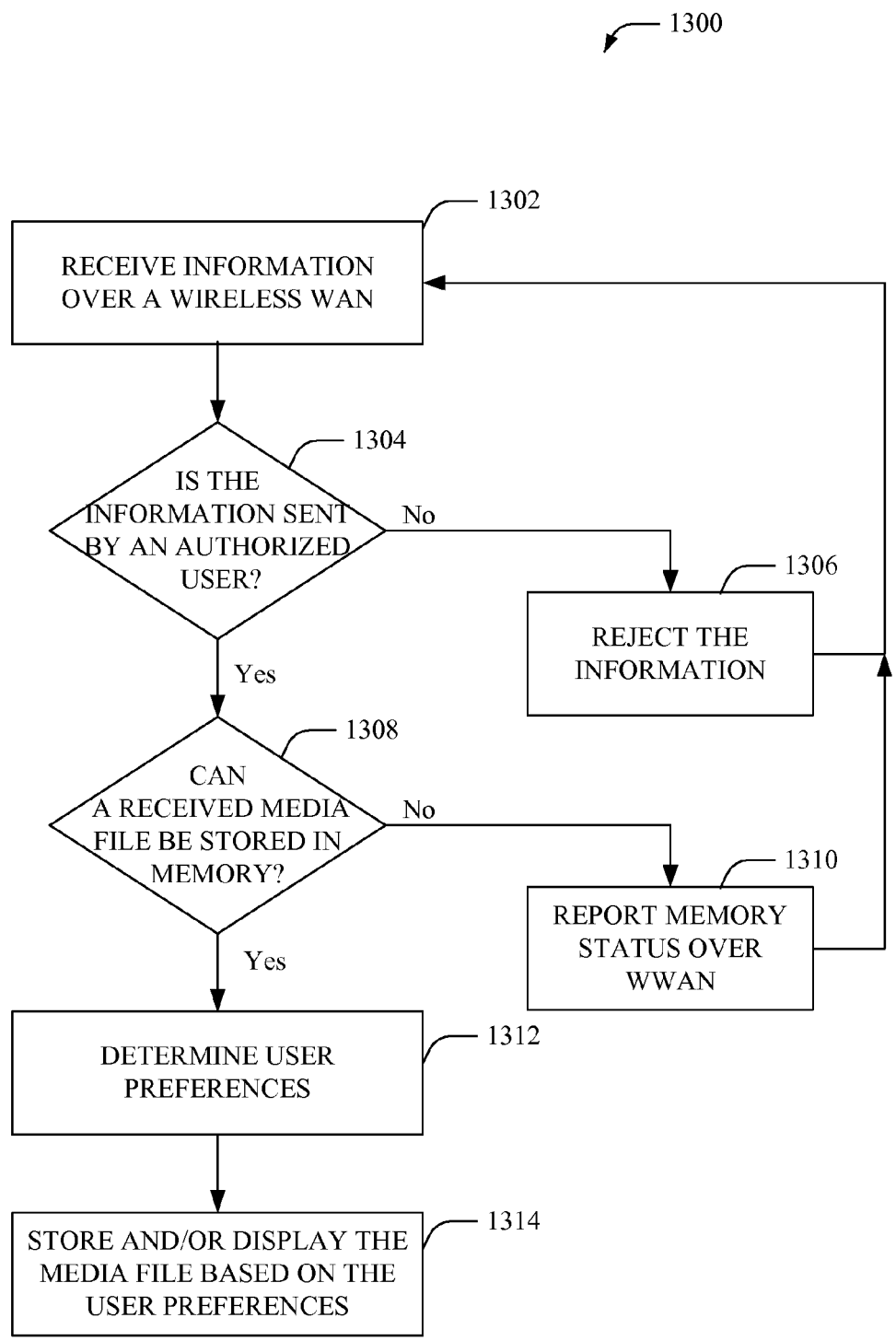
FIG. 13 illustrates an example methodology that facilitates display of media files received over WWAN, according to an aspect of the disclosed subject innovation.

FIG. 13 illustrates an example methodology 1300 that facilitates display of media files received over WWAN, according to an aspect of the disclosed subject innovation. At 1302, information can be received over the WWAN. The information can include one or more media files, broadcast alerts and/or data associated with user settings. The media files can be digital images, videos, audios and/or a combination thereof and can be received by employing, for example, a 2G/3G/3.5G/4G wireless connection. As an example, the information can be received via a WWAN modem, such as but not limited to a GPRS/EDGE/UMTS/HSPA/LTE modem that can include a SIM or USIM card.

At 1304, it is determined whether the received information is sent by an authorized user. Moreover, the sender of the information can be compared with an authorized list of users. However, most any other authorization technique can be employed to prevent malicious attacks and/or receiving spam. When the received information is from an unauthorized sender, the information can be rejected, blocked and/or deleted, as shown at 1306. It can be appreciated that the authorization of received information can also be handled by a server or by a client on the system subscriber's computer. When information is received from an authorized sender, a determination is made to check if the media files in the information can be stored in the memory based on the amount of available free space in the memory, as shown at 1308. If the memory is full and the media files cannot be completely downloaded, the network can be updated with the memory status as depicted at 1310. In addition, the sender (and/or the system subscriber) of the media files can be notified that the media files could not be delivered.

At 1312, user preferences can be determined when media files can be downloaded. Specifically, user preferences can be set by the system subscriber via the WWAN and/or can be set by the recipient via a variety of input devices. At 1314, the received media files can be stored and/or displayed to the recipient based on the preset user preferences.

Figure 14:
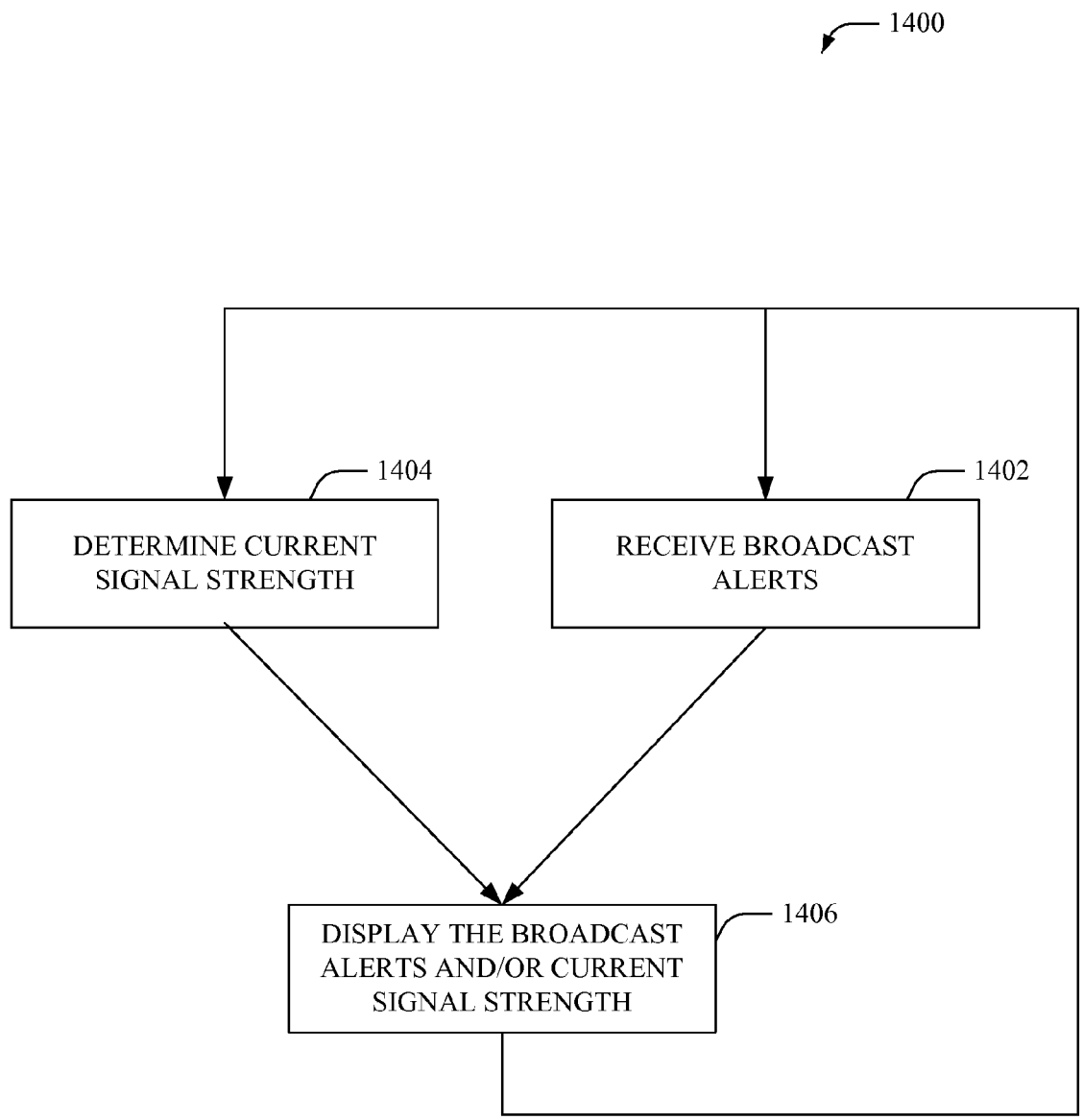
FIG. 14 illustrates an example methodology that can display alerts to an end user, according to an aspect of the subject disclosure.

Referring now to FIG. 14, there illustrated is an example methodology 1400 that can display alerts to an end user, according to an aspect of the subject disclosure. At 1402, a broadcast alert can be received, such as but not limited to, a weather alert. At 1404, the current signal strength can be determined. The strength of the signal can be based on the WWAN coverage area.

At 1406, the broadcast alert and/or the current signal strength can be displayed to the end user. Moreover, the broadcast alert and/or the current signal strength can be superimposed over a currently displayed picture or video on a display screen. In another aspect, an image/video/audio can stop being displayed and display a warning message associated with the broadcast alert can be displayed, until the warning is in effect. Additionally or alternately, an audio alarm can also be played. Further, the location of the broadcast alert and/or the current signal strength can be based on manually entered (e.g. by system subscriber or end user) or automatically determined user preferences. According to one aspect, the signal strength can be displayed only when the current signal strength is low. As an example, when determined that the current signal strength is below a predefined threshold a low signal indication can be displayed.

Figure 15:
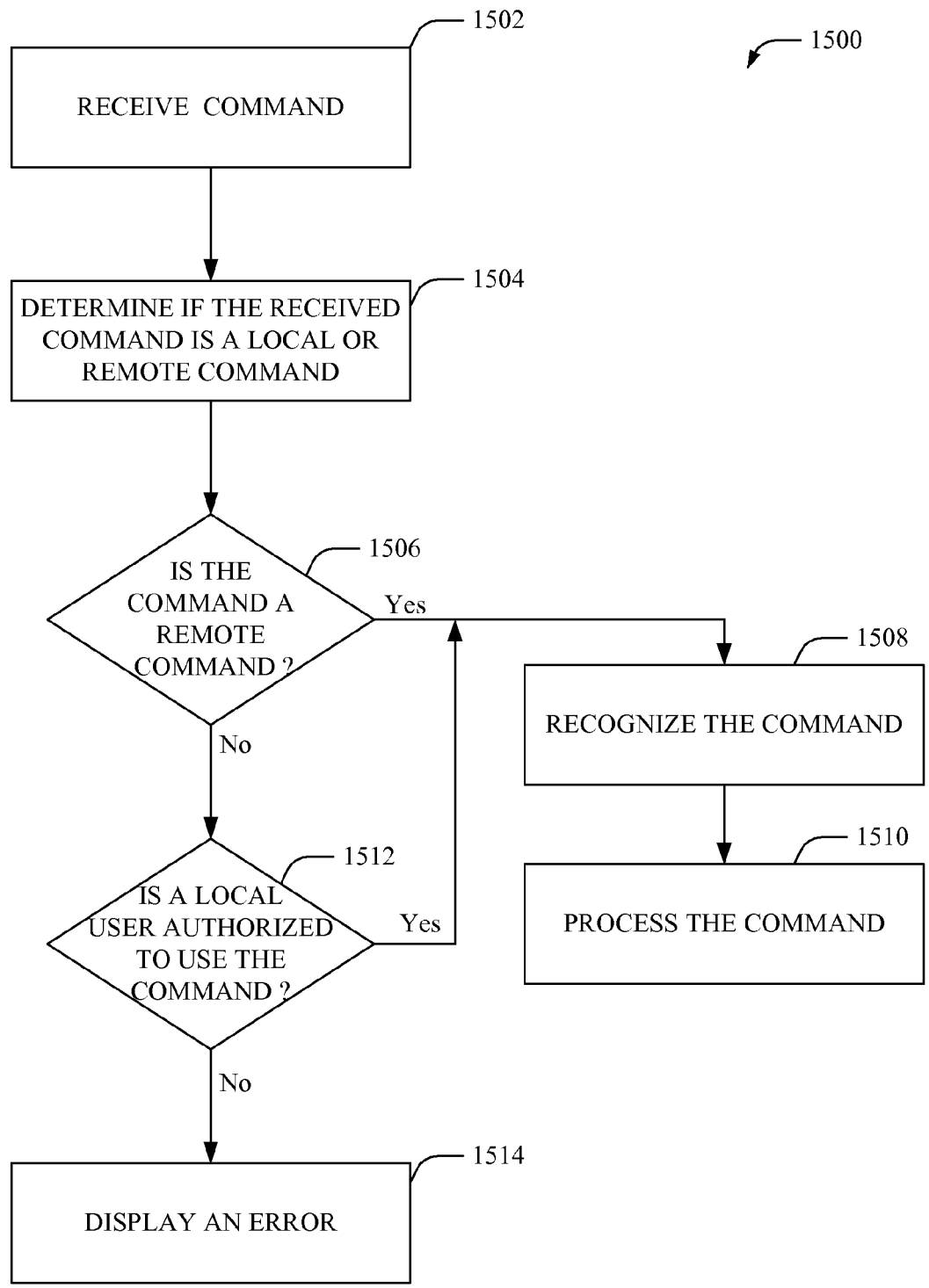
FIG. 15 illustrates an example methodology that can be employed to process commands received by a wireless enabled digital media frame in accordance with an aspect of the subject disclosure

FIG. 15 illustrates an example methodology 1500 that can be employed to process commands received by a wireless enabled digital media frame in accordance with an aspect of the subject disclosure. Moreover, a system subscriber can send one or more commands over the WWAN to control media display management and/or scheduling. Further, the system subscriber can also specify the commands that an end user can employ.

At 1502, a command can be received. At 1504, a determination can be made whether the received command is a remote command or a local command. Specifically, a remote command can be received over the WWAN and is typically sent by the system subscriber, and the local command can be entered by an end user by employing most any input device. At 1506, it can be determined if the received command is a remote command received over a WWAN. The remote command can be recognized at 1508 and processed accordingly at 1510. As an example, a remote command can be employed by a system subscriber to change display settings, receive media files, save media files, delete media files, display particular images, play audio clips, receive MMS, SMS and/or MBMS, report current memory status, place/ receive a voice call, and the like.

When a local command is received, a determination can be made if a local user (end user) is authorized to employ the local command, as shown by decision box 1512. According to an aspect, the local user can have a limited access to the commands that can be specified by the system subscriber. If the local user is not authorized to employ the received local command, an error message can be displayed to the local user, for example, indicating that the user is not authorized to perform this command, as shown at 1514. However, if the local user is authorized to employ the received local command, the local command can be recognized at 1508 and processed at 1510.

Figure 16:
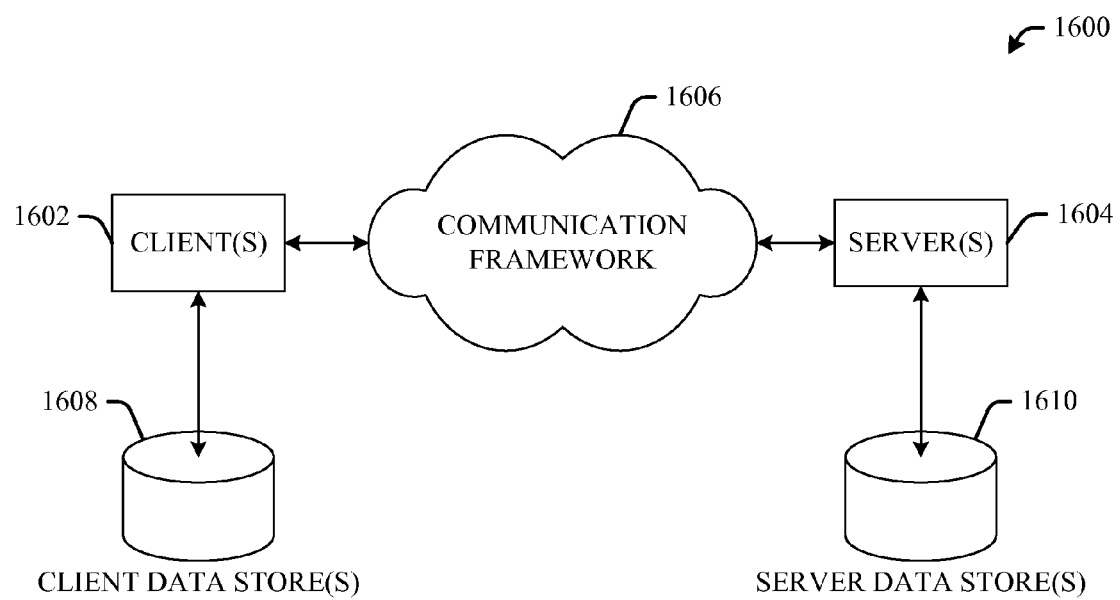
FIG. 16 illustrates a schematic block diagram of an exemplary computing environment in accordance with the subject innovation.

Referring now to FIG. 16, there is illustrated a schematic block diagram of a computing environment 1600 in accordance with the subject specification. The system 1600 includes one or more client(s) 1602. The client(s) 1602 can be hardware and/or software (e.g., threads, processes, computing devices).

The system 1600 also includes one or more server(s) 1604. The server(s) 1604 can also be hardware and/or software (e.g., threads, processes, computing devices). The servers 1604 can house threads to perform transformations by employing the specification, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory storing computer-executable instructions; and
a processor, communicatively coupled to the memory, that facilitates execution of the computer-executable instructions to perform operations comprising:
receiving, from a first device via a wireless wide area network, profile data that specifies a set of access restrictions associated with a second device that is granted limited permission to transmit data including a media file to a wireless enabled digital media frame device,
receiving, from the second device, the media file that is directed to the wireless enabled digital media frame device,
in response to the profile data satisfying an access criterion, delaying a display of the media file via the wireless enabled digital media frame device,
receiving, from the first device via the wireless wide area network, authorization data in accordance with facilitating a screening of the media file via the first device, and
facilitating the display of the media file via the wireless enabled digital media frame device in response to the receiving the authorization data.

2. The system of claim 1, wherein the operations further comprise receiving, from the first device via the wireless wide area network, access data that facilitates restriction of access to a functionality of the wireless enabled digital media frame device via an input interface of the wireless enabled digital media frame device.

3. The system of claim 1, wherein the media file is a first media file, the display is a first display, and the operations further comprise:
receiving, from the first device via the wireless wide area network, first identifier data indicative of a set of communication devices that are authorized to download media to the wireless enabled digital media frame device, and
prohibiting a second display of a second media file received from a third device in response to second identifier data indicative of the third device being determined not to be included within the first identifier data.

4. The system of claim 1, wherein the media file is a first media file, the profile data is first profile data, the display is a first display, and the operations further comprise:
receiving, from the first device via the wireless wide area network, second profile data indicative of a third device determined to be granted permission to transmit a second media file to a wireless enabled digital media frame device,
receiving, from the third device, the second media file that is directed to the wireless enabled digital media frame device, and
facilitating a second display of the second media file via the wireless enabled digital media frame device in response to the receiving the second media file.

5. The system of claim 1, wherein the operations further comprise verifying that the first device is authorized to transmit the profile data.

6. The system of claim 1, wherein the operations further comprise facilitating a presentation of a graphical representation indicative of broadcast alert data received over the wireless wide area network.

7. The system of claim 1, wherein the operations further comprise facilitating superimposition of a graphical representation that is indicative of a signal strength associated with the wireless wide area network over an image on a display screen of the wireless enabled digital media frame device.

8. The system of claim 6, wherein the operations further comprise:
receiving the broadcast alert data, and
facilitating presentation of an audio alert associated with broadcast alert data via a speaker device of the wireless enabled digital media frame device.

9. A method, comprising:
receiving, by a system comprising a processor, profile data from a first device via a wireless wide area network, wherein the profile data includes an access restriction associated with a second device that is granted limited permission to transmit data including a media file to a digital media frame device;

subsequent to receiving, from the second device, the media file that is directed to the digital media frame device, determining, by the system, that the profile data associated with the second device satisfies a predefined access criterion;

delaying, by the system, a display of the media file via the digital media frame device;

receiving, by the system, authorization data from the first device via the wireless wide area network as a function of facilitating a review of the media file via the first device; and facilitating, by the system, the display of the media file via the digital media frame device in response to the receiving the authorization data.

10. The method of claim 9, further comprising:

receiving, by the system, broadcast data indicative of a broadcast alert over the wireless wide area network; and facilitating, by the system, a presentation of a graphical representation associated with the broadcast alert.

11. The method of claim 9, further comprising:

determining, by the system, signal strength data indicative of a signal strength associated with the wireless wide area network; and facilitating, by the system, a presentation of a graphical representation associated with the signal strength.

12. The method of claim 9, further comprising:

determining, by the system, a memory status associated with a data store related to the digital media frame device; and directing, by the system, status data indicative of the memory status to the first device over the wireless wide area network.

13. The method of claim 9, further comprising:

receiving, by the system, access data from the first device via the wireless wide area network based on the access data, denying, by the system, access to a functionality of the digital media frame device via an input interface of the digital media frame device.

14. The method of claim 9, further comprising:

determining, by the system, that the digital media frame device is authorized to receive the profile data from the first device.

15. A non-transitory computer readable storage medium comprising computer executable instructions that, in response to execution, cause a system including a processor to perform operations, comprising:

receiving, from a first device via a wireless wide area network, profile data that specifies that a second device is granted limited permission to transmit data to a digital media frame device;

receiving, from the second device via the wireless wide area network, a media file that is directed to the digital media frame device;

based on the profile data, delaying a display of the media file via the digital media frame device;

receiving, from the first device via the wireless wide area network, authorization data based on a review of the media file via the first device, and facilitating the display of the media file via a display screen of the digital media frame device in response to the receiving the authorization data.

16. The non-transitory computer readable storage medium of claim 15, wherein the receiving the profile data includes receiving the profile data in response to authenticating the first device.

17. The non-transitory computer readable storage medium of claim 15, wherein the operations further comprise:

receiving broadcast data indicative of a broadcast alert from a network device via the wireless wide area network; and facilitating a presentation of a graphical representation based on the broadcast data.

18. The non-transitory computer readable storage medium of claim 15, wherein the operations further comprise:

based on access data received from the first device, prohibiting execution of a command received from an input device associated with the digital media frame.

19. The non-transitory computer readable storage medium of claim 15, wherein the operations further comprise:

receiving, from the first device, management information associated with management of the media file over the wireless wide area network.

20. The non-transitory computer readable storage medium of claim 15, wherein the receiving the media file includes receiving the media file during a predefined interval of time.

* * * * *